United States Patent
Wakui

(10) Patent No.: US 7,433,475 B2
(45) Date of Patent: Oct. 7, 2008

(54) ELECTRONIC DEVICE, VIDEO CAMERA APPARATUS, AND CONTROL METHOD THEREFOR

(75) Inventor: Tetsuya Wakui, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 561 days.

(21) Appl. No.: 10/992,696

(22) Filed: Nov. 22, 2004

(65) Prior Publication Data

US 2006/0013567 A1    Jan. 19, 2006

(30) Foreign Application Priority Data

| Nov. 27, 2003 | (JP) | ............................ 2003-397817 |
| Sep. 13, 2004 | (JP) | ............................ 2004-265928 |

(51) Int. Cl.
- H04B 1/02       (2006.01)
- G11B 27/36      (2006.01)
- H04B 10/12      (2006.01)

(52) U.S. Cl. ........................... 381/94.1; 360/31
(58) Field of Classification Search ............... 381/94.1, 381/94.2, 94.5, 94.8, 67; 700/94; 360/31; 359/337.2
See application file for complete search history.

(56) References Cited

U.S. PATENT DOCUMENTS 6,780,159 B2 *  8/2004  Sandler et al. ............... 600/504

FOREIGN PATENT DOCUMENTS

| JP | 7-177596      | 7/1995  |     |
| JP | 2000-293806   | 10/2000 |     |
| JP | 2000-293965   | 10/2000 |     |
| JP | 2001-320794 A | * 11/2001 |   |
| JP | 2002-367298   | 12/2002 |     |
| JP | 2003-123408   | 4/2003  |     |
| JP | 2003-317409   | 11/2003 |     |

OTHER PUBLICATIONS

Japanese Official Action (Reasons for Refusal) in Japanese Patent Appln. No. 2003-397817 (with English-language translation).
Argument and Amendment filed in Japanese Patent Appln. No. 2003-397817 (with English-language translation).

* cited by examiner

*Primary Examiner*—Ping Lee
(74) *Attorney, Agent, or Firm*—Fitzpatrick, Cella Harper & Scinto

(57) ABSTRACT

According to this invention, if noise generated by operation of a component such as a rotary drum of a recording/playback apparatus which operates periodically enters a microphone, noise waveforms can be extracted and reduced. Data obtained from microphones (6, 7) are converted into digital data by A/D converters (11, 12) and are supplied to a control microcomputer (5) and adders (15, 16). The control microcomputer (5) has a memory which stores input data for respective mechanical noise generation cycles. The microcomputer (5) calculates the average of inphase data in each cycle, thereby generating only data of noise components and storing the result in memories (13, 14). The adders (15, 16) output data without noise components by subtracting the inphase data stored in the memories (13, 14) from input current data.

4 Claims, 24 Drawing Sheets

ELECTRONIC DEVICE, VIDEO CAMERA APPARATUS, AND CONTROL METHOD THEREFOR

FIELD OF THE INVENTION

The present invention relates to a technique for processing speech data obtained from an acoustic wave gathering means such as a microphone.

BACKGROUND OF THE INVENTION

As an apparatus of this type, for example, there is known a camcorder. Such apparatus uses a magnetic tape as a recording medium and adopts a helical-scan mechanism which uses a rotary drum to increase the recording density of the recording medium. In this mechanism, however, noise called head rattle is generated when the magnetic tape comes into contact with or separates from a rotary printhead. Since energization of a magnetic motor coil is switched on/off to drive the rotary drum, electromagnetic noise also occurs. These noise components enter an internal microphone and are recorded together with speech to be recorded, and the speech becomes offensive to the ear.

To solve the problem, there is disclosed a noise reduction method of examining in advance the spectrum of noise which may enter a microphone and subtracting a component in the band in accordance with the magnitude of the noise (e.g., Japanese Patent Laid-Open No. 7-177596).

According to this proposal, a means for extracting a component in the noise spectrum is provided, the level of the noise is measured while speech to be recorded is cut off, and control is performed such that a noise component to be subtracted has the same level as that of the noise mixed with the speech. With this operation, the noise is reduced by the level of the spectrum of the noise and produces little effect on speech when the speech is input.

However, in the conventional methods, noise components need to be examined in advance, and a means for extracting noise by the number of spectral components in the noise, i.e., bandpass filters are necessary. To avoid this, there can be considered a method of collectively extracting frequencies whose spectra are close to each other and reducing the number of bandpass filters. For example, when the noise spectra are 1 kHz and 2 kHz, the center frequency is set to 1.5 kHz, and the bandwidth is set to 1 kHz, noise components of 1 kHz and 2 kHz can be removed. However, if the level of 1 kHz and that of 2 kHz are different in this case, the two levels are averaged or either of them is used. The obtained level is not equal to that of noise components, and a noise removal effect is reduced. If a speech signal to be recorded has a 1.5-kHz component, the component may attenuate to influence the speech quality. If the level changes over time, the canceling level needs to be adjusted again. If the spectrum of noise changes, it is difficult to cope with the change.

SUMMARY OF THE INVENTION

The present invention has as its object to provide a technique for removing mechanical noise which is found in advance to be generated in an apparatus and can follow a change over time in mechanical noise.

In order to attain the object, an electronic device according to the present invention includes the following arrangements, i.e., an acoustic wave gathering unit which converts an acoustic wave into an electrical signal, a driving unit which operates in cycles, an operation unit which averages pluralities of acoustic data output from the acoustic wave gathering unit over a plurality of cycles of the driving unit to obtain inphase acoustic data, and a synthesizing unit which synthesizes in phase an average of the acoustic data output from the operation unit and acoustic data output from the acoustic wave gathering unit.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Embodiments according to the present invention will be described in detail with reference to the accompanying drawings.

Figure 1:
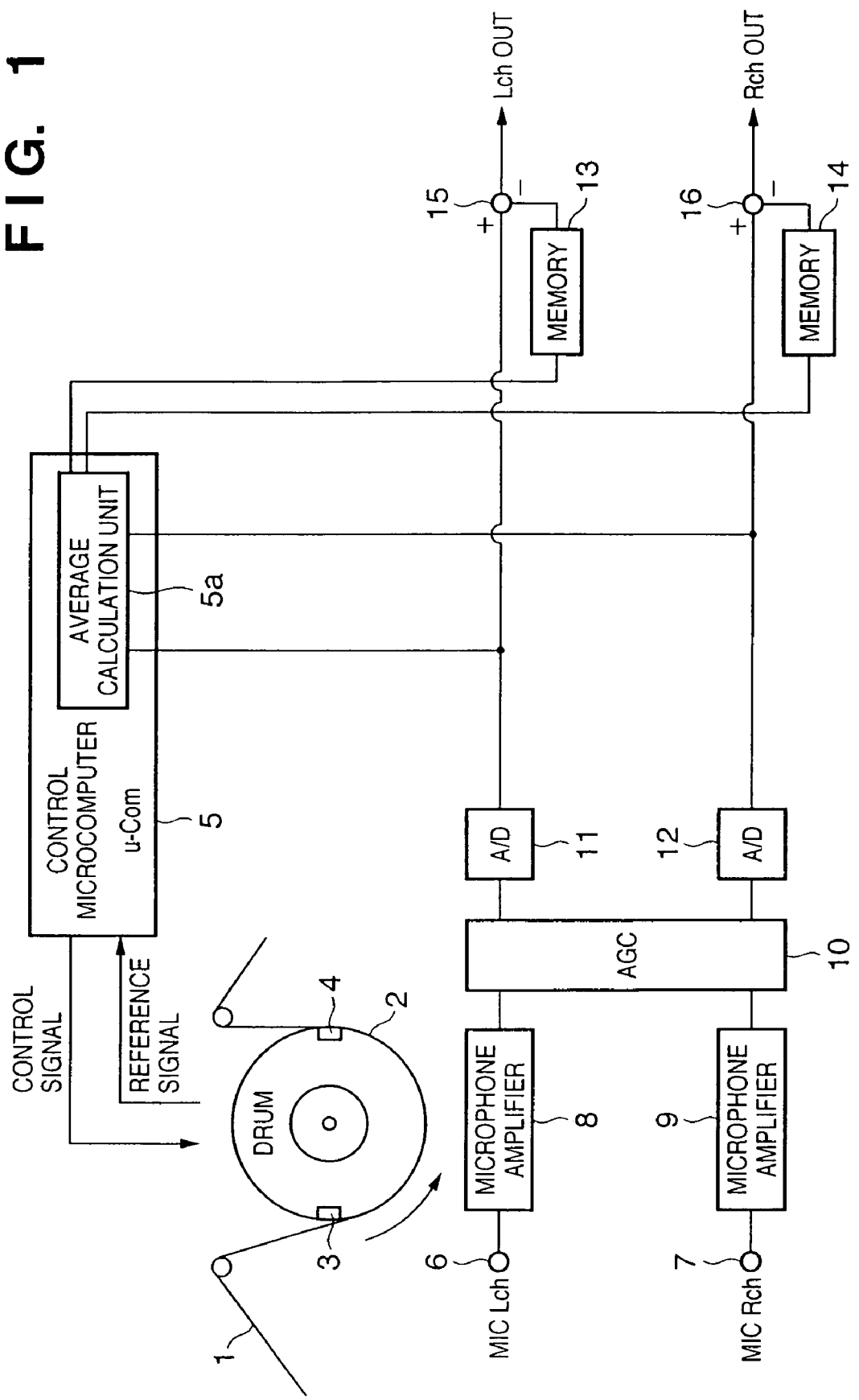
FIG. 1 is a block diagram according to the first embodiment.

FIG. 1 is a block diagram showing the main arrangement of a speech recording/playback unit (helical-scan recording/playback unit) in a digital video camera apparatus to which the first embodiment is applied.

In FIG. 1, reference numeral 1 denotes a magnetic tape of a recording medium (magnetic tape cassette is not shown); 2, a rotary drum; 3 and 4, magnetic heads which are mounted on the rotary drum and record speech or video data; 5, a control microcomputer which has an average calculation unit 5a; 6 and 7, microphones for L and R channels; 8 and 9, microphone amplifiers; 10, an AGC (automatic level control circuit); 11 and 12, A/D converters; 13 and 14, memories; and 15 and 16, adders.

In this arrangement, speech signals are converted into electrical signals by the microphones 6 and 7 and are amplified by the microphone amplifiers 8 and 9. The amplified signals are amplified by the automatic level control circuit 10 so as to have an appropriate loudness level and are converted into digital data by the A/D converters 11 and 12.

A helical-scanned recording signal is recorded on the magnetic tape 1 through the rotary heads 3 and 4 attached at an angle of 180° from each other to the rotary drum 2. The rotary drum 2 outputs a reference signal indicating the phase of rotation, e.g., head switching pulses to the control microcomputer 5 to notify the control microcomputer 5 of the contact state of the magnetic heads 3 and 4 with the magnetic tape 1, thereby controlling a timing when a recording signal is supplied to the magnetic heads 3 and 4. When the magnetic heads 3 and 4 come into contact with or separate from the magnetic tape 1 wound around the rotary drum 2, noise (mechanical vibrations) may occur and enter the microphones 6 and 7 together with speech signals.

Figure 2:
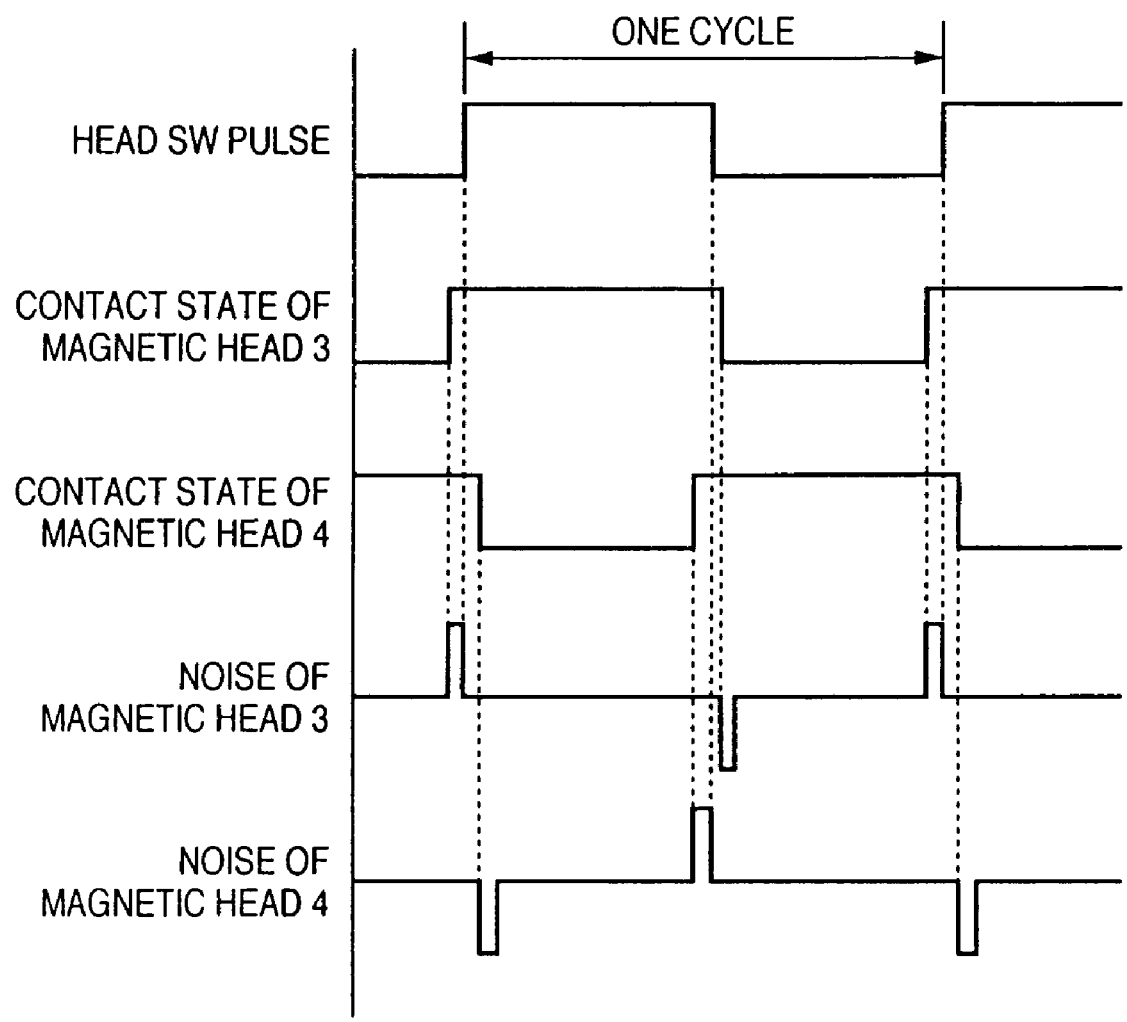
FIG. 2 is a timing chart showing noise generation timings with respect to rotation of a rotary drum and the contact state between magnetic heads and a magnetic tape according to the first embodiment.

FIG. 2 shows a time relationship between the reference signal, a timing when the magnetic heads 3 and 4 come into contact with the magnetic tape 1, and noise generation.

In FIG. 2, when a head switching pulse is at high level, a recording signal is applied to the magnetic head 3 while the head switching pulse is at low level, the recording signal is applied to the magnetic head 4. One cycle of the head switching pulse represents one revolution of the rotary drum 2. Each magnetic head needs to come into contact with the magnetic tape 1 and become stable before a recording signal is applied to the magnetic head. For this reason, the magnetic head comes into contact with the magnetic tape 1 a little before switching of recording signal application and is kept in contact with the magnetic tape 1 for a while after a recording signal is applied to the magnetic tape. The contact states of the magnetic heads 3 and 4 are shown in FIG. 2. A high level represents that a corresponding magnetic head is in contact while a low level represents the magnetic head is in non-contact. Below the contact states, there are shown noise generation timings at this time.

Figure 3:
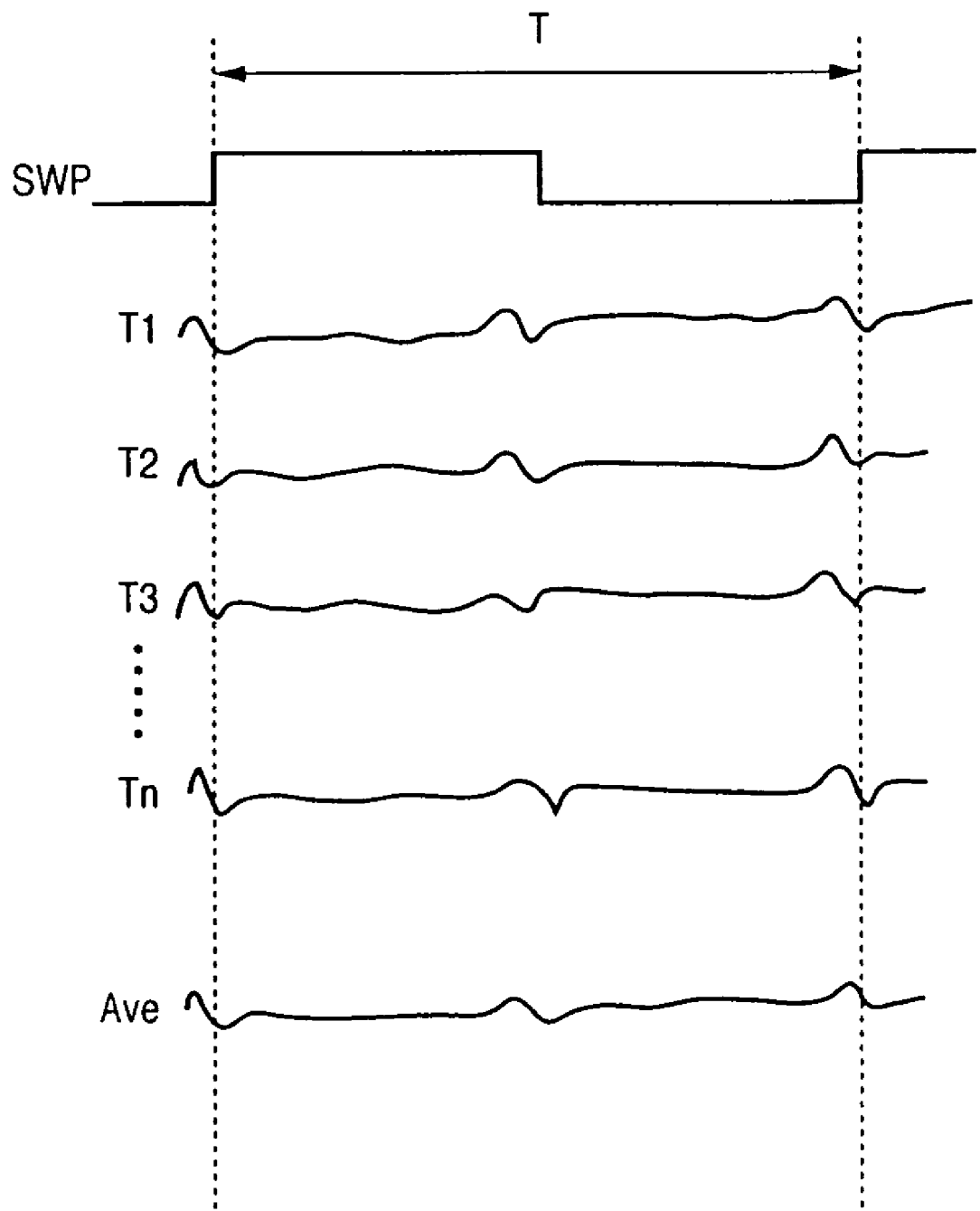
FIG. 3 is a chart showing the waveforms of periodic noise according to the first embodiment.

FIG. 3 shows this phenomenon as noise waveforms. In FIG. 3, with respect to a time period T corresponding to one cycle of the head switching pulse shown at the top, a time period subsequent to the time period T is divided into cycle time periods T1, T2, T3, ..., Tn, and the time periods are arranged. As can be seen from FIG. 3, noise generated every revolution remains substantially the same. This is because there is little component which causes a change between the rotary head and the magnetic tape. The waveform of an average Ave is shown at the bottom.

Figure 4:
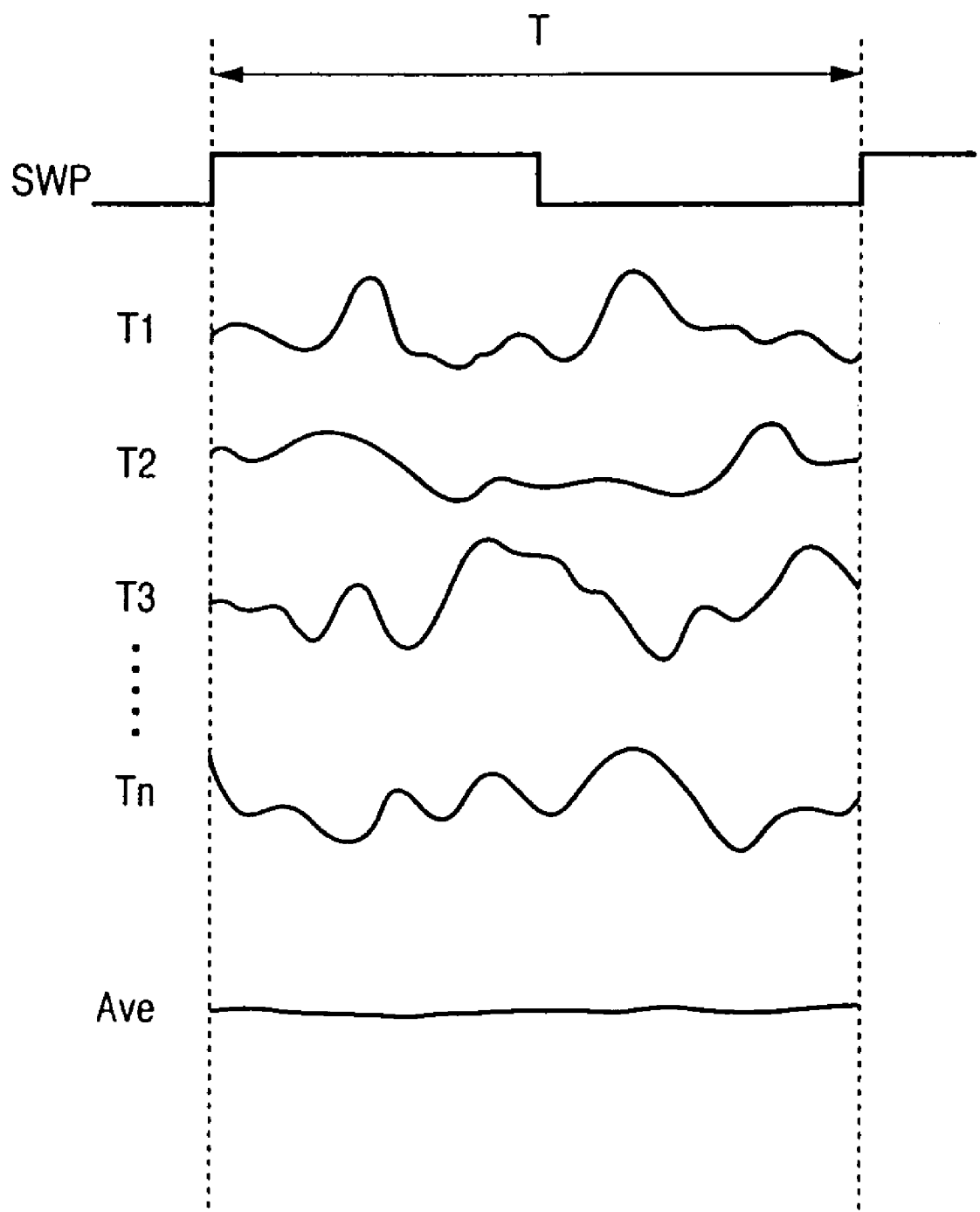
FIG. 4 is a chart showing the waveforms of asynchronous speech according to the first embodiment.

FIG. 4 shows the state of each audio signal input to the microphone 6 or 7 during the time period T corresponding to one cycle of the head switching pulse. More specifically, the time period subsequent to the time period T is divided into the cycle time periods T1, T2, ..., Tn, and the time periods are arranged. Since these changes in audio signal during one cycle are irrelevant to the head switching pulse, they are unlikely to synchronize. When they are averaged more often, the average infinitely approaches zero.

If speech data is stored for an appropriate time period, and inphase data in the time period T corresponding to one cycle of the head switching pulse is added to the speech data, only noise components shown in FIG. 3 remain. This embodiment utilizes a characteristic difference shown in FIGS. 3 and 4.

As operation of this embodiment, extraction operation of the average Ave will be described first.

Figure 5:
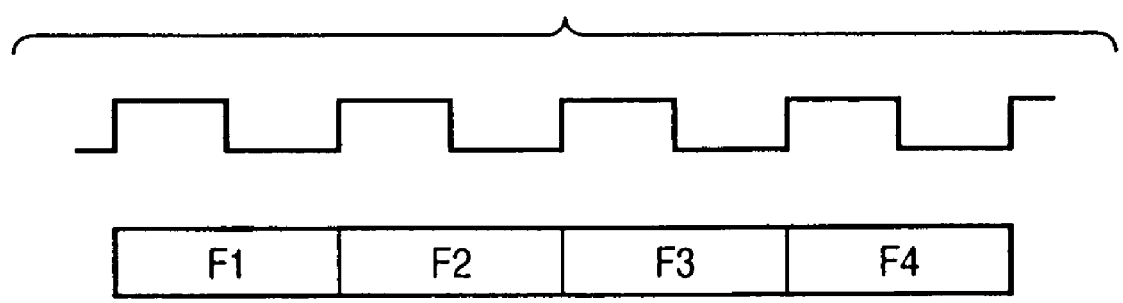
FIG. 5 is a view showing a data sequence according to the first embodiment.
Figure 6:
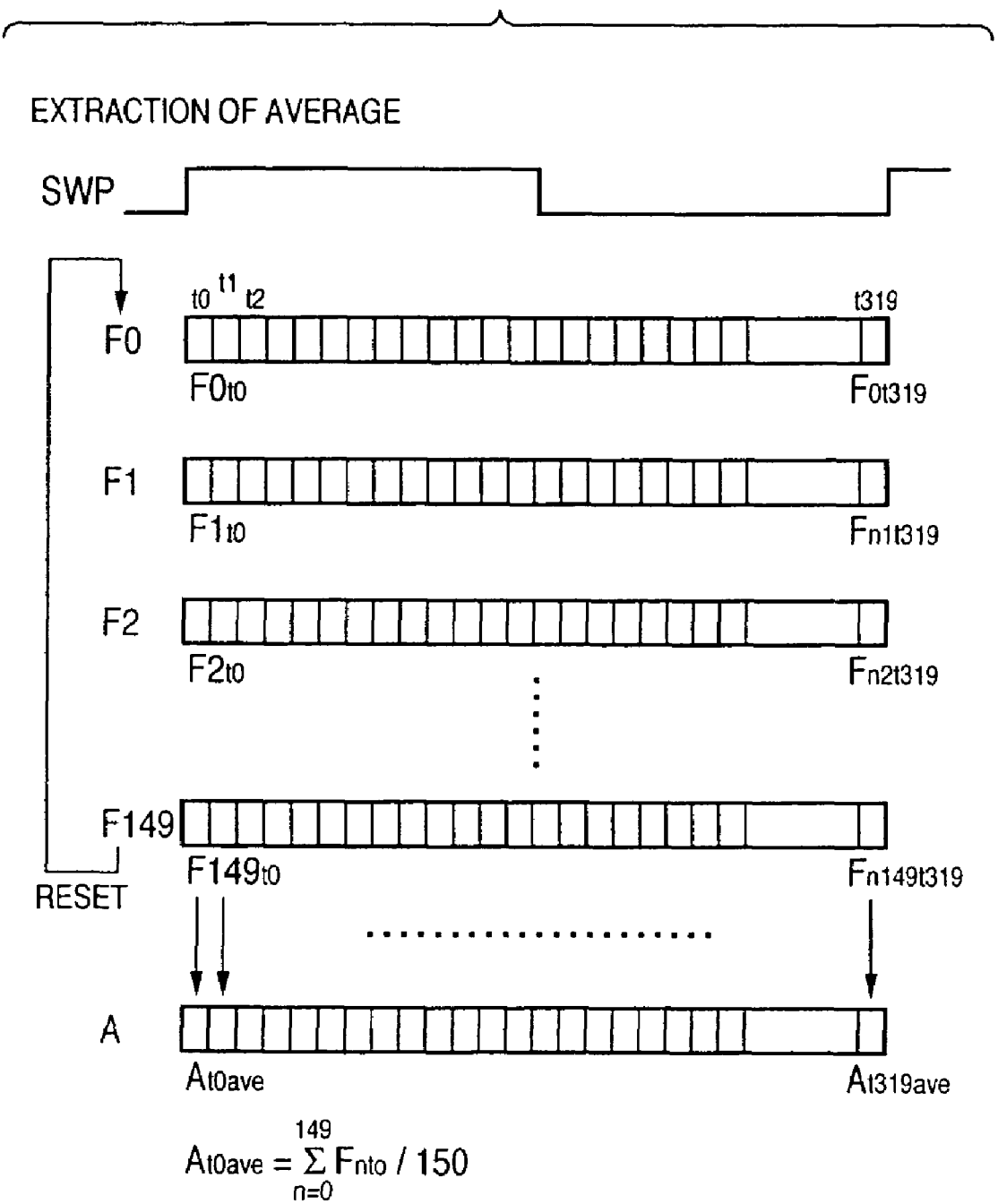
FIG. 6 is a view for explaining data row processing according to the first embodiment.

Outputs from the A/D converters 11 and 12 are input to the average calculation unit 5a of the control microcomputer 5. Data of each input digital data sequence are arranged using leading edges of the head switching pulses as a reference. Letting F1, F2, F3, ... be time periods having a width of one cycle of the head switching pulse, a relationship as shown in FIG. 5 is obtained. In the case of, e.g., a digital video camera, if one cycle of the head switching pulse is 1/150 sec, and a frequency at which an audio signal is sampled is 48 kHz, 320 digital data are generated per microphone channel in one cycle of the head switching pulse, as shown in FIG. 6. Using leading edges of the head switching pulses as a reference, the first data and subsequent data will be referred to as t0, t1, t2, ..., t319. The data are assigned cycle-specific headings. The data of the first cycle are defined as F1t0, F1t1, F1t2, ..., F1t319. The data of the next cycle are defined as F2t0, F2t1, F2t2, ..., F2t319. If data of one sec are to be averaged, the data of the last cycle are defined as F149t0, F149t1, F149t2, ..., F149t319. When the data of 150 cycles are considered as a matrix with (the number of data of one cycle) columns and (the number of cycles) rows, the matrix has 320×150 elements. To obtain the average waveform of one cycle from these data, data corresponding to the symbol tn at the same time point (inphase) are summed and are divided by the number of data. Letting A be an average, an average At0 which is the average of sampled-data at time t0 is represented by the following equation:

$$At0 = \sum_{n=0}^{149} Fnt0 / 150 \tag{1}$$

The control microcomputer 5 controls the memories 13 and 14 for the respective channels in the following manner. When the number of sample data input in succession exceeds 150, i.e., data next to the data at time t319 in line F149 is to be input, the data is input as data at time t0 in line F0.

As described above, every time inphase data is input from the switching pulse, data in the memories 13 and 14 are updated. If the data sampling frequency is 48 kHz, 320 data are generated in one cycle. The averages of input inphase data are calculated every sampling frequency of 48 kHz and are stored in the memories 13 and 14 for the respective channels.

Figure 11:
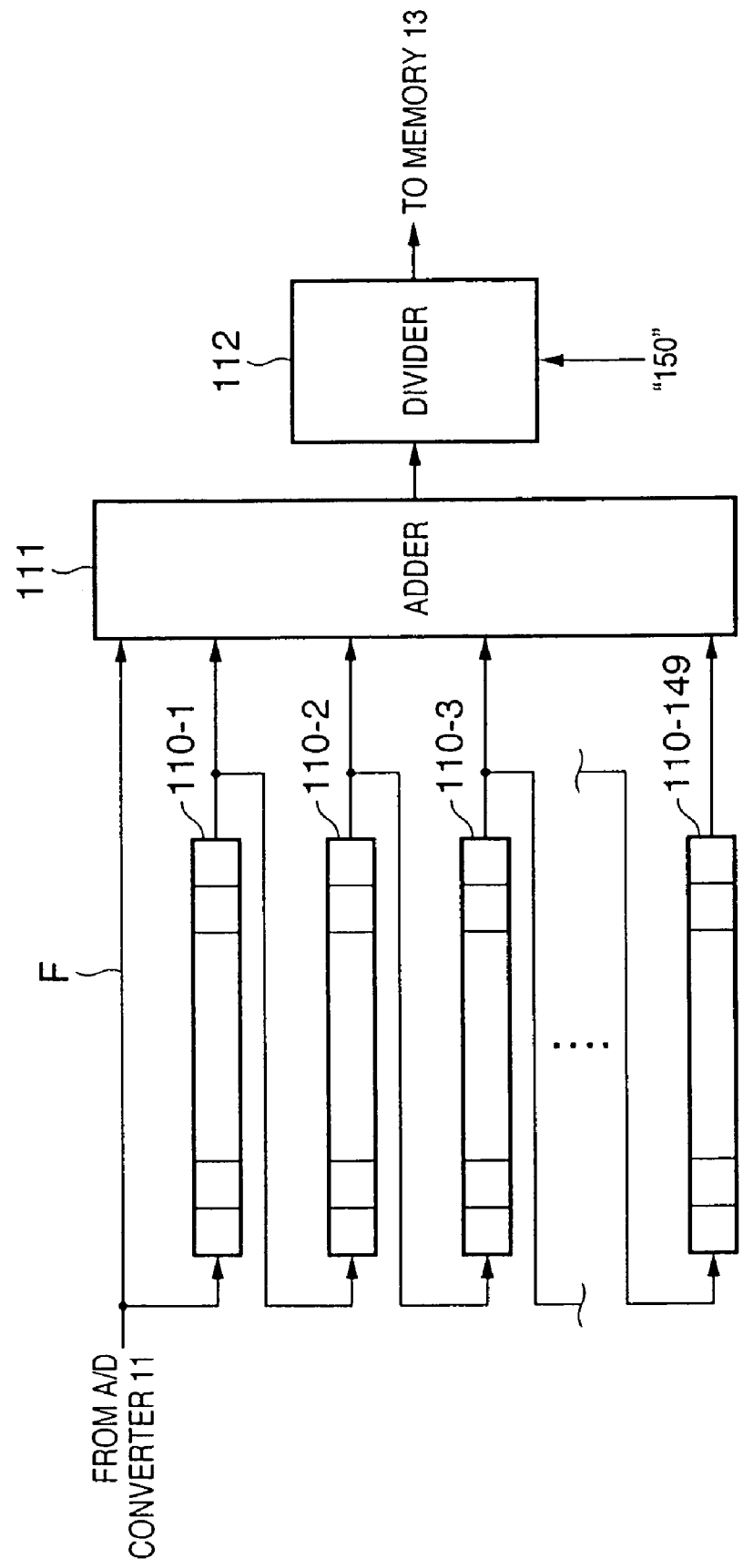
FIG. 11 is a diagram showing the specific arrangement of an average calculation unit according to the first embodiment.

The average calculation unit 5a having the arrangement shown in FIG. 11 can implement the above-mentioned processing. FIG. 11 shows the arrangement for calculating an average to be stored in the memory 13. The arrangement for calculating an average to be stored in the memory 14 is the same as the arrangement for the memory 13.

In FIG. 11, reference numerals 110-1 to 110-149 denote FIFO memories each of which can store 320 data from the A/D converter 11. Reference numeral 111 denotes an adder which adds data from the A/D converter 12 and data from the (149) FIFOs; and 112, a divider which divides a sum by 150. These circuits operate in synchronism with the sampling frequency (in this embodiment, 48 kHz).

Since each FIFO memory can store 320 data (data corresponding to one cycle of the drum 2), data output from the FIFO memory 110-1 precedes data output from the A/D converter 11 at that time by 1/150 sec (the data are in phase with each other). Since data output from the FIFO memory 110-1 is input to the FIFO memory 110-2 in the next stage, data output from the FIFO memory 110-2 further precedes data from the FIFO memory 110-1 by 1/150 sec. Since the 149 FIFO memories are provided as shown in FIG. 11, 150 inphase data including data from the A/D converter 11 are supplied to the adder 111. The adder 111 adds the 150 data and outputs the sum to the divider 112. The divider 112 divides the sum by a divisor of 150. Accordingly, the divider 112 outputs a value represented by equation (1) shown above. The memories 13 and 14 substantially need only store one data, and thus, they can be replaced with registers.

Noise reduction operation will be described next. Processes for the respective channels are the same, and one of them will be described.

A microphone signal from the microphone 6 is mixed with noise and is converted into digital data by the A/D converter 11. One digital data is input to the adder 15, and the input is a positive phase input. As the other input, data from the memory 13 is input to the adder 15 in opposite phase (minus sign) and serves as a subtraction element. A data sequence using the switching pulse as a reference is obtained by subtracting an average Atn of noise, from data to be stored in succession in the memory 13, i.e., time tn (n: integer) from an arbitrary switching pulse of an arbitrary cycle Fm (m: integer) of a positive phase input signal of the adder 15. An output signal OUTtn from the adder 15 is expressed by:

$$OUTtn = Fmtn - Atn \qquad (2)$$

Noise generated by rotation of the drum can be removed.

Figure 7:
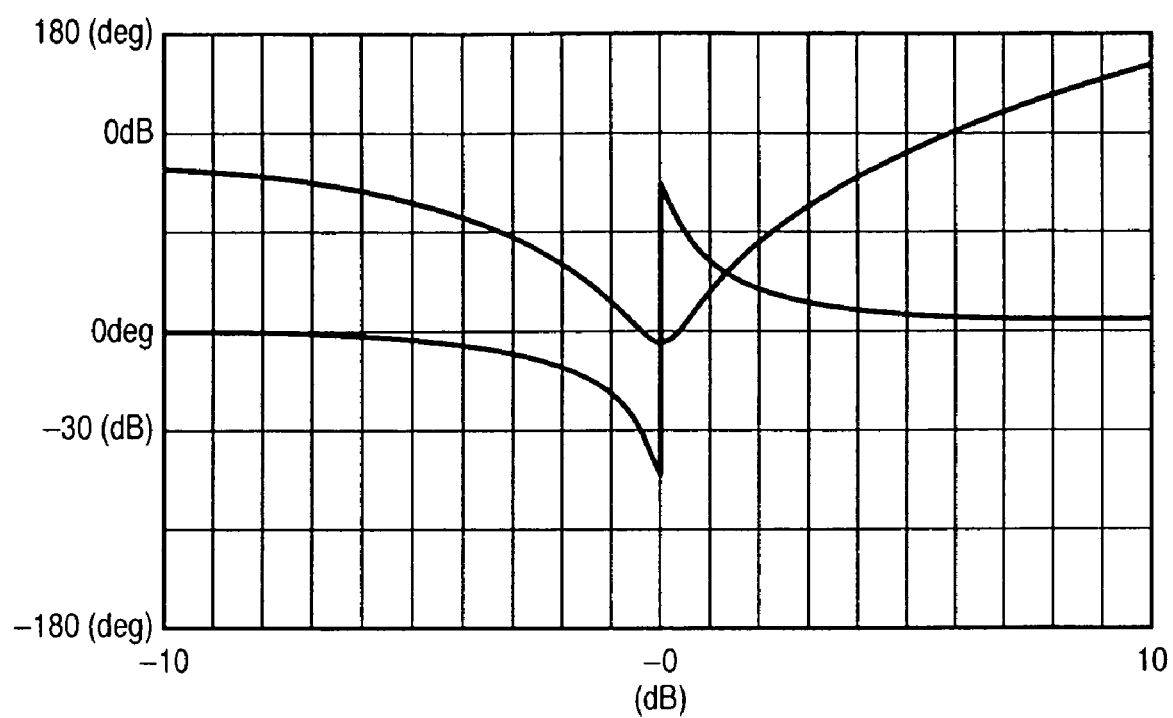
FIG. 7 is a graph showing the reduced amount of noise according to the first embodiment.

The attenuation amount of noise at this time depends on the rotation precision of the rotary drum 2 and the fluctuation range in level of generated noise. Assume that with respect to the maximum frequency of noise components to be reduced, rotation nonuniformity changes the phase of the frequency by, e.g., 5°, and the fluctuation range is 2 dB with respect to the average. FIG. 7 shows the attenuation amount when calculating the difference between two signals having different phases and levels. Considering the above-mentioned conditions, the attenuation amount reaches 15 dB or more, and a sufficient effect can be obtained.

As described above, according to this embodiment, even when periodic mechanical noise generated in the apparatus is superposed on an electrical signal obtained through the microphone, speech data without the noise can be obtained by storing data which cancels the mechanical noise in the memories 13 and 14. As for data stored in the memories 13 and 14, data corresponding to the latest periodic mechanical noise generated in the apparatus is stored. Thus, noise can be removed in accordance with a change over time.

Second Embodiment

Figure 8:
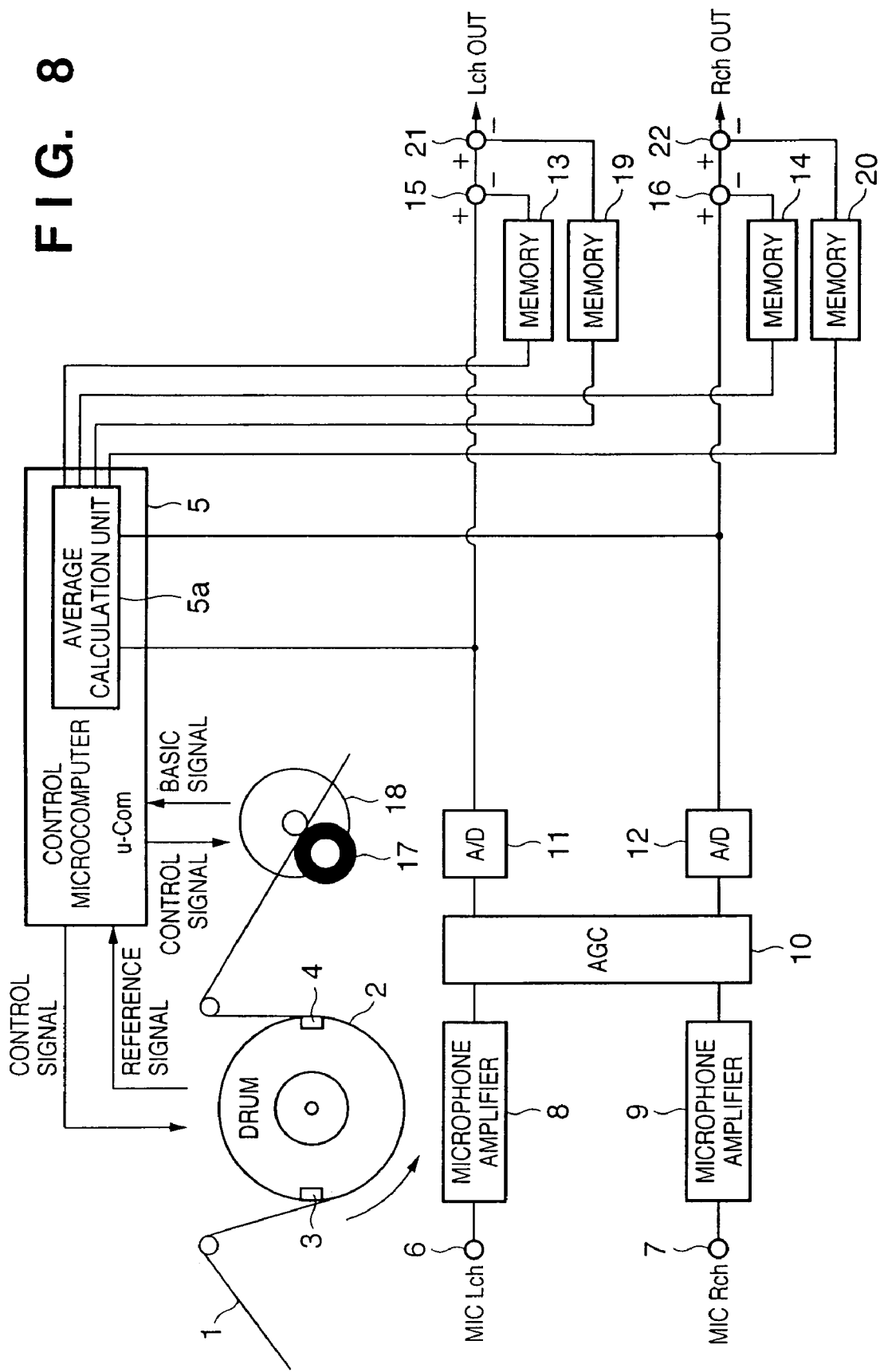
FIG. 8 is a block diagram according to the second embodiment.

FIG. 8 shows the arrangement that pertains to noise removal according to the second embodiment. This embodiment aims at reducing electromagnetic noise generated in a capstan, in addition to the noise reduction process of a helical-scan recording/playback unit using a magnetic tape as a recording medium according to the above embodiment (first embodiment).

The same reference numerals 1 to 16 in the second embodiment denote the same parts as described with reference to FIG. 1, and a description thereof will be omitted.

Reference numeral 17 denotes a pinch roller disposed to make the magnetic tape 1 as a recording medium travel; 18, a capstan which conveys the magnetic tape 1; 19 and 20, memories; and 21 and 22, adders. In this arrangement, additional components will be explained.

A reference signal from the rotary drum 2 is assumed as the first reference signal. In one revolution of the capstan, which conveys the magnetic tape 1, the second reference signal using some position of the capstan is output from the capstan 18 and is input to the control microcomputer 5. On the basis of the second reference signal, data from the A/D converters 11 and 12 are input to the data processing unit of the control microcomputer 5. Data of each input digital data sequence are arranged using leading edges of the second reference signal as a reference. For example, if the frequency of one revolution of the capstan is 3 Hz, and the sampling frequency of one cycle is 48 kHz, 12,000 sampled-data are generated. Let C1, C2, C3, . . . be time periods each having a width of one cycle of the second reference signal. The first data and subsequent data from a leading edge of the second reference signal will be referred to as t0, t1, t2, . . . , t11999. The data are assigned cycle-specific headings. If the data of the first cycle are defined as C1t0, C1t1, C1t2, . . . , C1t11999, the data of the next cycle are defined as C2t0, C2t1, C2t2, . . . , C2t11999. If data of 12 sec are to be averaged, the data of the last cycle are defined as C39t0, C39t1, C39t2, . . . , C39t11999. When the data are considered as a matrix with (the number of data of one cycle) columns and (the number of cycles) rows, the matrix has 12000×40 elements. To obtain the average waveform of one cycle from these data, data corresponding to the symbol tn at the same time point are summed and are divided by the number of data. Letting A be an average, an average Act0 which is the average of sample data at time t0 is represented by the following equation:

$$Act0 = \sum_{n=0}^{39} Cnt0/40 \qquad (3)$$

The control microcomputer 5 controls the memories 19 and 20 for the respective channels in the following manner. When the number of sample data input in succession exceeds 40, i.e., data next to the data at time t11999 in line C39 is to be input, the data is input as data at time t0 in line C0. The arrangement at this time is substantially the same as that shown in FIG. 11, and a description thereof will be omitted.

As described above, 40 data at the same time point are always stored from the second reference signal. If the data sampling frequency is 48 kHz, 12,000 data are generated in one cycle. The averages are calculated every sampling frequency of the second reference signal and are stored in the memories 19 and 20 for the respective channels.

Noise reduction operation will be described next. Processes for the respective channels are the same, and one of them will be described. A microphone signal from the microphone 6 is mixed with noise caused by contact between the rotary drum and the magnetic tape and electromagnetic noise at the time of rotation of the capstan and is converted into digital data by the A/D converter 11. As described in the first embodiment, the average of noise in synchronism with rotation of the rotary drum is stored in the memories 13 and 14, and the adders 15 and 16 remove the noise to make outputs to the adders 21 and 22. The adders 21 and 22 receive output signals from the adders 15 and 16 as positive phase inputs. As the other inputs, data from the memories 19 and 20 are input to the adders 21 and 22 in opposite phase and serve as subtraction elements. As described above, since the average of the noise in synchronism with rotation of the capstan is stored in the memories 19 and 20, the adders 21 and 22 subtract the average and reduce noise generated in the capstan. More specifically, letting DN be the time sequence of noise of the rotary drum, a data sequence using a switching pulse as a reference comprises $DNt0, DNt1, DNt2, \ldots, DNt319$. Letting CN be the time sequence of noise of the capstan having a different cycle, a data sequence comprises $CNt'0, CNt'1, CNt'2, \ldots, CNt'12000$. Since reference symbols tn and t'm representing times have different cycles, as described above, letting Mtk be a speech signal sequence, a last output signal OUTtk at a certain time point is represented by the following equation (4):

$$OUTtk = Mtk + DNtn + CNt'm - Atn - Act'm \quad (4)$$

Since $DNtn \approx Atn$ and $CNt'm \approx Act'm$ hold, noises are removed, and $OUTtk \approx Mtk$ holds.

Third Embodiment

In the first embodiment, all necessary data must be prepared to average 150 data. Assume that the sampling frequency is 48 kHz, and a time period for averaging is one sec. In this case, the number of memories required to calculate the average, i.e., a sum M of the number of data stored for calculation and the number of data for storing the average is as follows:

$$M = 48000 + 320 \text{ (per channel)}$$

When one data is expressed by 16 bits, a total number TM for the two channels is as follows:

$$TM = 2M \times 16 = 1546240 \text{ bytes}$$

This requires a memory having a non-negligible capacity.

Figure 9:
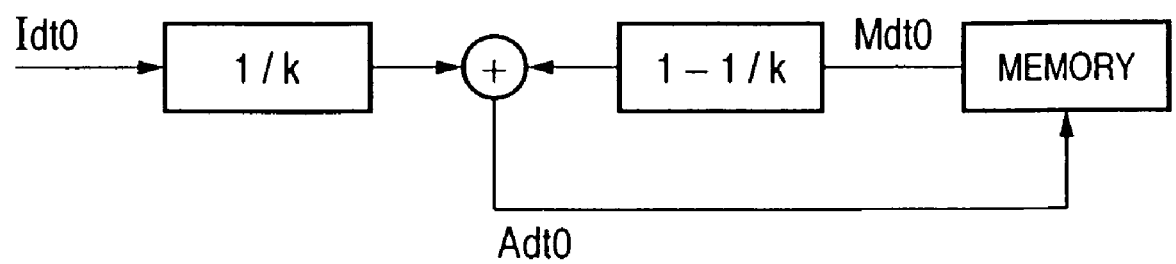
FIG. 9 is a block diagram according to the third embodiment.

Under the circumstances, according to the third embodiment, there is proposed a technique for reducing the memory capacity. FIG. 9 shows the arrangement for saving the memory capacity according to this embodiment.

As shown in FIG. 9, to calculate the average of k (k is an integer of not less than 1) data, data to be input is equivalent to data obtained by weighting a previous average by 1/k.

Thus, new input data is first multiplied by 1/k, data from the memory, which stores the previous average, is weighted by "1−1/k" (=(k−1)/k) and added, and the memory is updated with the result.

For example, assuming that k is set to 150 so as to correspond to the average of 150 data, and letting Idt0 be an input signal; and Mdt0, a signal from the memory, as in the first embodiment. A calculated average Adt0 is represented by:

$$Adt0 = 1/150 \times Idt0 + 149/150 \times Mdt0$$

The number of data for one frame (one revolution of the drum) is 320, and thus, only memories for 320 data are required.

For this reason, when one data is expressed by 16 bits, a total number TM of the memories (for two channels) is as follows:

$$TM = 320 \times 2 \times 16 = 10240 \text{ bits}$$

This arrangement can be implemented on a small scale.

With the above-mentioned arrangement, when k=150, a correct average of the past 150 frames cannot be calculated unless data for 150 frames are input. The time required for this is about 1 sec. Also, when the arrangement is applied to a digital video camera, recording is not performed immediately after the power-on, and an instruction for recording is issued after confirming that an object falls within the field of view. For this reason, no practical problem occurs.

Fourth Embodiment

In the first to third embodiments, a circuit for determining whether the signal level of an input signal is much higher (at a level exceeding a predetermined threshold value) than noise data may be provided. The following control may be added. That is, if the input signal level is sufficiently higher, the data is regarded as speech signal data other than noise and is excluded from calculated values obtained by average calculation. With this control, in calculating the average of noise, the average data of only noise generated by calculating non-noise data having a higher level than a noise value can be prevented from being broken. This makes it possible to extract more accurate noise waveforms and increase the noise reduction degree.

Figure 10:
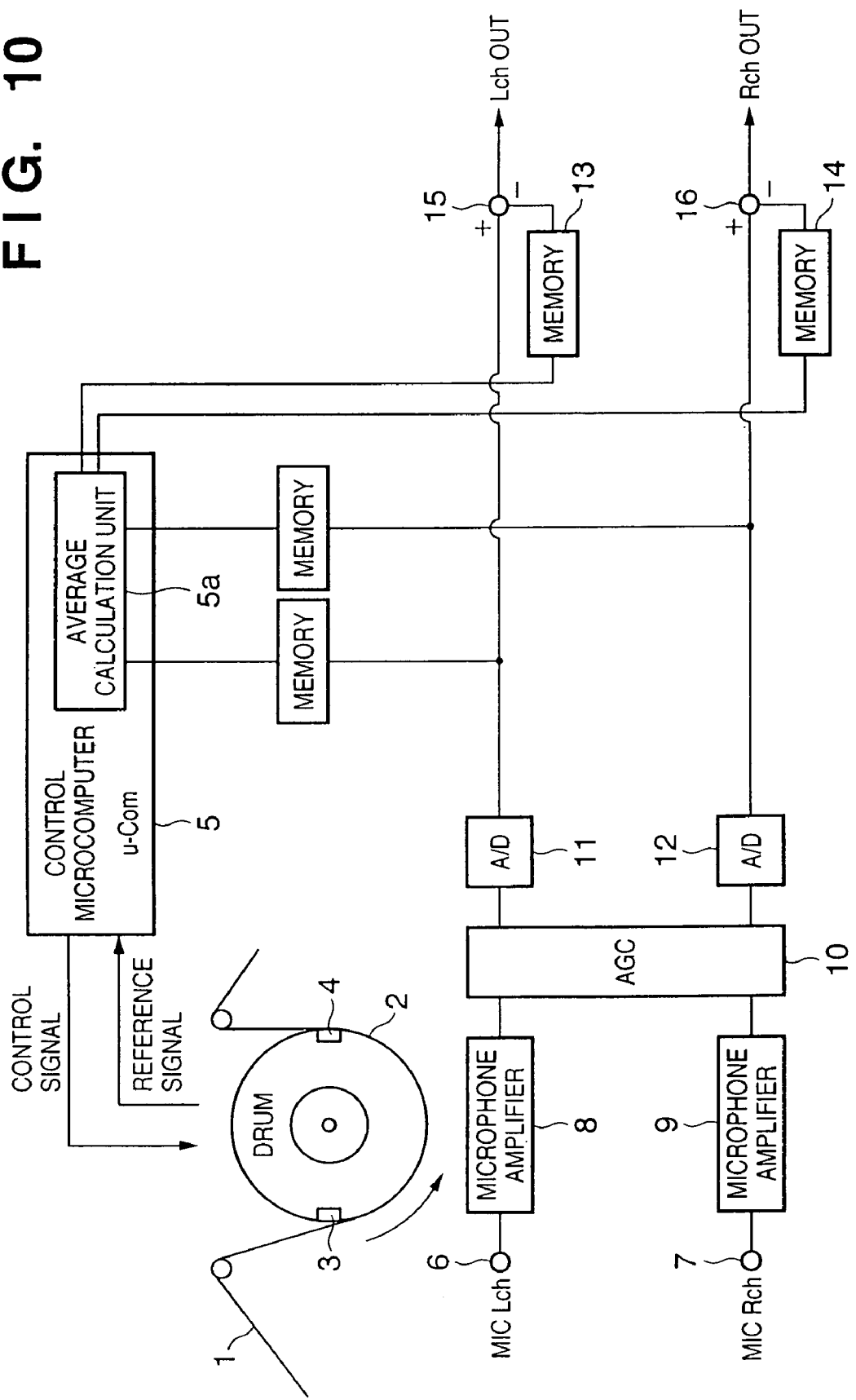
FIG. 10 is a block diagram according to still another embodiment.

FIG. 10 is obtained by adding memories 23 and 24 in paths from A/D converters 11 and 12 to a control microcomputer 5 in FIG. 1, and changing a control method.

In this arrangement, one of two channels will be described. Data output through the A/D converter 11 is received by the memory 23. The memory 23 receives data of one cycle of a switching pulse, and the control microcomputer 5 determines whether there is data having an absolute value more than the predetermined threshold value out of the data of one cycle. If any one of the data exceeds the threshold value, all data for the cycle of the switching pulse are not treated as data for averaging. If all data are less than the threshold value, they are treated as average data.

This process makes it possible to more accurately determine whether data contains speech louder than noise and prevent breaking average data of only noise generated by calculating non-noise data having a level higher than a noise value. This makes it possible to enable more accurate noise waveform extraction and increase the noise reduction degree.

The first to fourth embodiments have exemplified noise generated when a head mounted on a drum which records a magnetic tape comes into contact with or separates from the tape and electromagnetic noise at the time of rotation of a capstan, as noise from a source of mechanical noise. The present invention, however, is not limited to this. In short, the present invention may be applied to any noise as far as it is a periodic mechanical noise and may enter a microphone.

As described above, according to this embodiment, when noise from a component such as a rotary drum, which performs periodic operation, of a recording/playback apparatus enters a microphone, noise waveforms can be extracted, and the noise can be reduced.

Also, as for noise from a component such as a rotary drum or one which performs periodic operation like rotation of a capstan motor for conveying a tape, noise waveforms can be extracted every independent cycle. There can be provided an apparatus which produces better noise reduction effect.

Even when noise entering a microphone varies in level and tone quality depending on the device, individual adjustment is unnecessary. In case of a change over time, noise specific to the device can be handled by the same means and same processing.

Unlike the prior art, speech components to be recorded are not removed by filtering, and only unnecessary noise waveforms are removed. Noise reduction without degradation in speech quality can be implemented.

Fifth Embodiment

The fifth embodiment according to the present invention will be described below in detail.

Figure 12:
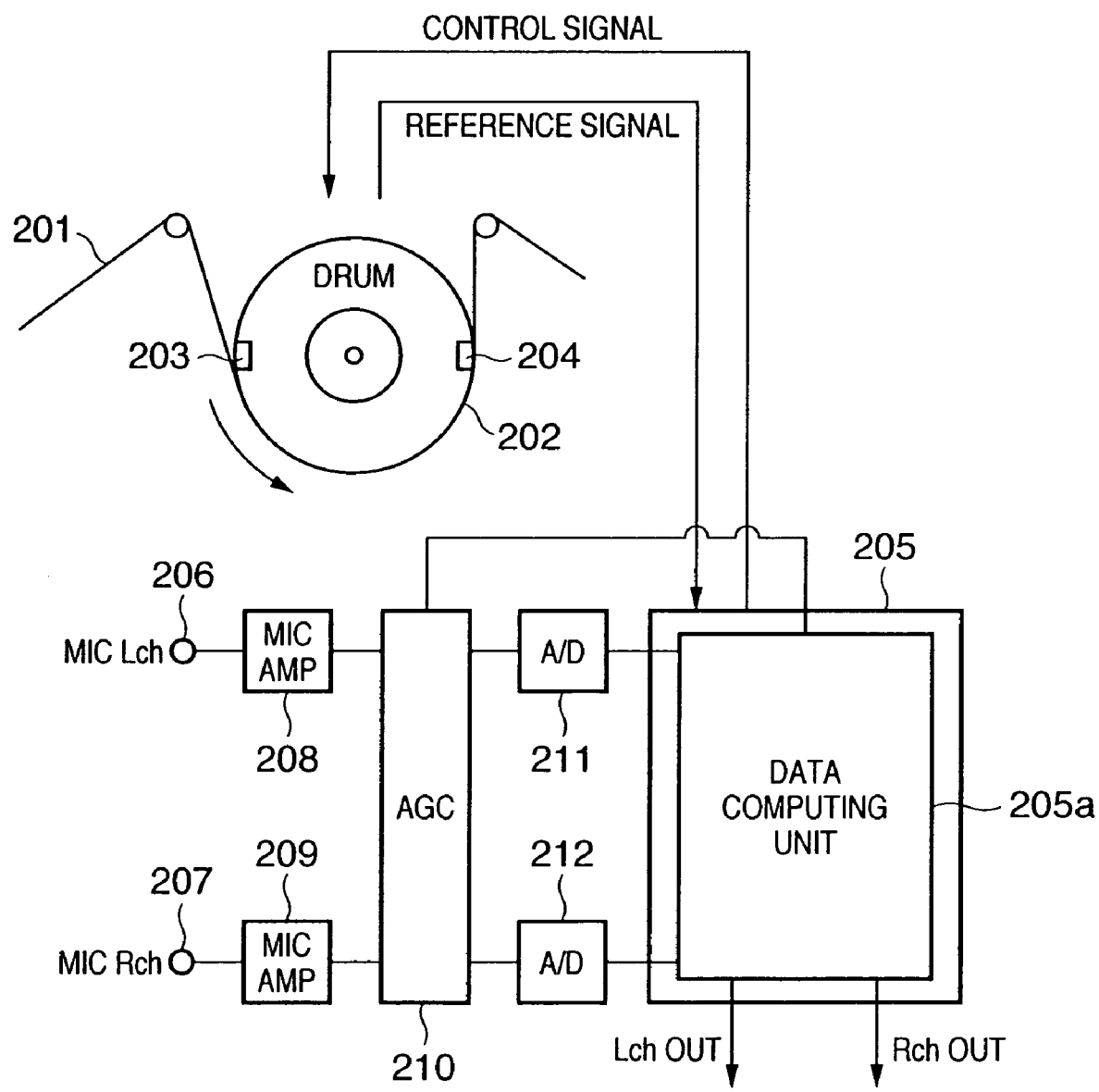
FIG. 12 is a block diagram according to the fifth embodiment.

FIG. 12 is a block diagram showing the main arrangement of speech recording/playback unit (helical-scan recording/playback unit in a digital video camera apparatus to which the fifth embodiment is applied. The video camera comprises a CCD image sensing element, focusing lens, and optical unit (image sensing unit) which drives the lens. The optical unit is driven and controlled by a known method. The driving control method is not directly related to the present invention, and the arrangement thereof will be omitted.

In FIG. 12, reference numeral 201 denotes a magnetic tape of a recording medium (magnetic tape cassette is not shown); 202, a rotary drum; 203 and 204, magnetic heads which are mounted on the rotary drum and record speech or video data; 205, a control microcomputer which has a data computing unit 205a (to be described in detail); 206 and 207, microphones for L and R channels; 208 and 209, microphone amplifiers; 210, an AGC (automatic level control circuit); and 211 and 212, A/D converters which output signed 16-bit data.

In this arrangement, speech signals are converted into electrical signals by the microphones 206 and 207 and are amplified by the microphone amplifiers 208 and 209. The amplified signals are amplified by the automatic level control circuit 210 so as to have an appropriate loudness level and are converted into digital data by the A/D converters 211 and 212.

Figure 13:
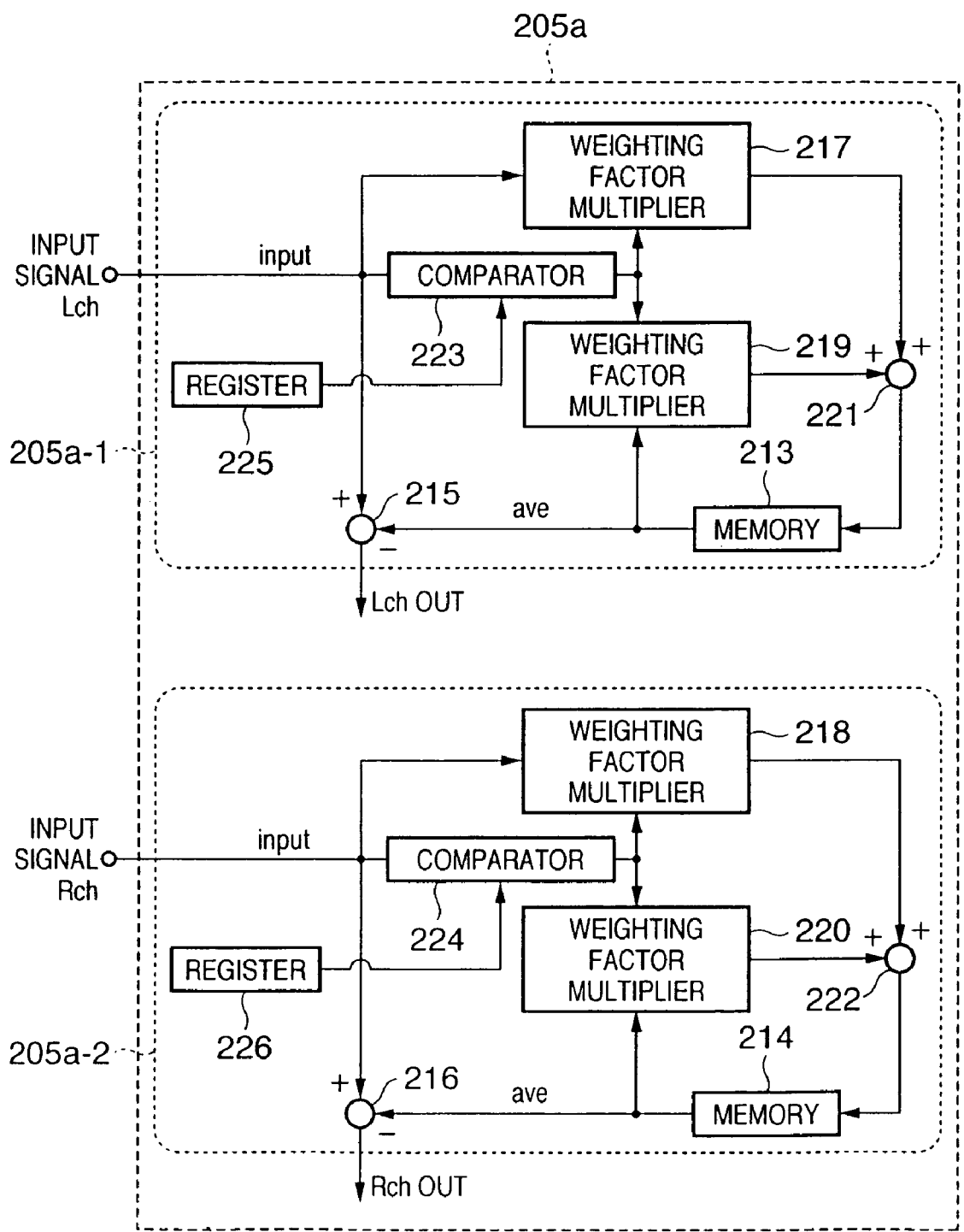
FIG. 13 is a block diagram of a data computing unit according to the fifth embodiment.

The data computing unit 205a of the fifth embodiment has independent circuitries 205a-1 and 205a-2 for the L and R channels, as shown in FIG. 13.

In FIG. 13, reference numerals 213 and 214 denote memories; 215, 216, 221, and 222, adders; 217, 218, 219, and 220, weighting factor multipliers; 223 and 224, comparators; and 225 and 226, registers which store threshold values. The circuitry for the L channel is the same as that for the R channel. The arrangement and operation for the L channel will be described.

The register 225 according to the fifth embodiment stores two threshold values Th1 and Th2 (Th1<Th2). The comparator 223 determines whether an input signal (input) serving as speech data falls within a range between the threshold values Th1 and Th2 or falls outside the range. The determination result is output to the weighting factor multipliers 217 and 219. Upon reception of a control signal indicating that the input signal falls within the range between Th1 and Th2, the weighting factor multiplier 217 multiplies the input signal by a factor K0 (K0<1) and outputs the product to the adder 221. On the other hand, upon reception of a control signal indicating that the input signal falls outside the range between Th1 and Th2, the weighting factor multiplier 217 multiplies the input signal by a factor K1 (K1<K0<1) and outputs the product to the adder 221.

Upon reception of a control signal indicating that the input signal falls within the range between Th1 and Th2, the weighting factor multiplier 219 multiplies data ave from the memory 213 by (1−K0) and outputs the product to the adder 221. On the other hand, upon reception of a control signal indicating that the input signal falls outside the range between Th1 and Th2, the weighting factor multiplier 219 multiplies the input signal by (1−K1) and outputs the product to the adder 221.

The memory 213 stores the sum obtained from the adder 221, thereby updating its information.

In the fifth embodiment as well as the described first embodiment, a case will be described wherein when the magnetic heads 203 and 204 come into contact with or separate from the magnetic tape 201 wound around the rotary drum 202, noise (mechanical vibrations) may occur and enter the microphones 206 and 207 together with speech signals.

More specifically, the fifth embodiment aims at storing only noise components shown in FIG. 3 in the memory 213 (and memory 214) and removing the noise components by the adder 215.

As operation of the fifth embodiment, a process of storing the average Ave in the memory 213 will be described below.

As described above, outputs from the A/D converters 211 and 212 are input to the data computing unit 205a (see FIG. 13) of the control microcomputer 205.

The arrangement for the L channel is the same as that for the R channel, and only the L channel will be described.

Data from the A/D converter 211 is input to the comparator 223 in synchronism with a sampling clock (in this embodiment, 48 kHz). The comparator 223 compares the data with the two threshold values stored in the register 225 and generates a signal to select a weighting factor for the weighting factor multipliers 217 and 219.

The weighting factor multiplier 217 holds two weighting factor K1 and K2 and selects one in accordance with a signal from the comparator 223. The weighting factor multiplier 217 multiplies the input data by a selected weighting factor K (=either K1 or K2; a value less than 1).

The weighting factor multiplier 219 holds two weighting factors (1−K1) and (1−K2) and selects one in accordance with a signal from the comparator 223. The weighting factor multiplier 219 multiplies the input data by a selected weighting factor (1−K) (=either (1−K1) or (1−K2); a value less than 1).

For the sake of descriptive simplicity, the weighting factor for the weighting factor multiplier 217 is assumed to be K while the weighting factor for the weighting factor multiplier 219 is assumed to be (1−K).

A calculation result obtained from the weighting factor multiplier 217 is output to the adder 221.

The weighting factor multiplier 219 multiplies data from the memory 213 (storing 0 in its initial state) by the weighting factor (1−K) and outputs the product to the adder 221.

The adder 221 adds data from the two weighting factor multipliers 217 and 219 and updates data in the memory 213 with the sum.

For example, if K=0.01, the weighting factor multiplier 217 calculates (input data input×0.01). The weighting factor multiplier 219 calculates (data ave from the memory 213× 0.99). This is equivalent to calculating the average of 100 inphase data of one cycle of a head switching pulse. The memory 213 contains 0 as its initial value. For this reason, after a predetermined time has lapsed, the signal ave in FIG. 3 is stored in the memory 213.

Subtracting data from the memory 213 from the input data input by the adder 215 makes it possible to output acoustic data without noise.

The above-mentioned processing will be described more plainly below.

Let FmIn be the mth input frame; FmIn(tn) be data at a certain phase position in the input frame FmIn; and Fm(tn) be data at the same phase position from the memory 213. In this case, the adder 221 calculates the following expression:

$$FmIn(tn) \times K + Fm(tn) \times (1-K)$$

The (tn)th data in the memory 213 is updated with the operation result.

If data output from the adder 215 is expressed as FmOut (tn), the data can be represented by the following equation:

$$FmOut(tn) = FmIn(tn) - Fm(tn)$$

After a certain period of time has lapsed, Fm(tn) becomes the same as the signal ave(tn) in FIG. 3. Accordingly, the average is subtracted from a time point from an arbitrary switching pulse of an arbitrary cycle Fm (m: integer) of an input signal. Noise generated by rotation of the drum can be removed.

The attenuation amount of noise at this time depends on the rotation precision of the rotary drum 202 and the fluctuation range in level of generated noise. Assume that with respect to the maximum frequency of noise components to be reduced, rotation. nonuniformity changes the phase of the frequency by, e.g., 5°, and the fluctuation range is 2 dB with respect to the average ave. FIG. 7 shows the attenuation amount when calculating the difference between two signals having different phases and levels. Considering the above-mentioned conditions, the attenuation amount reaches 15 dB or more from FIG. 7, and a sufficient effect can be obtained.

The reasons for setting two threshold values in the comparator 223 (and comparator 224) of FIG. 13 in the fifth embodiment will be described below.

Figure 15:
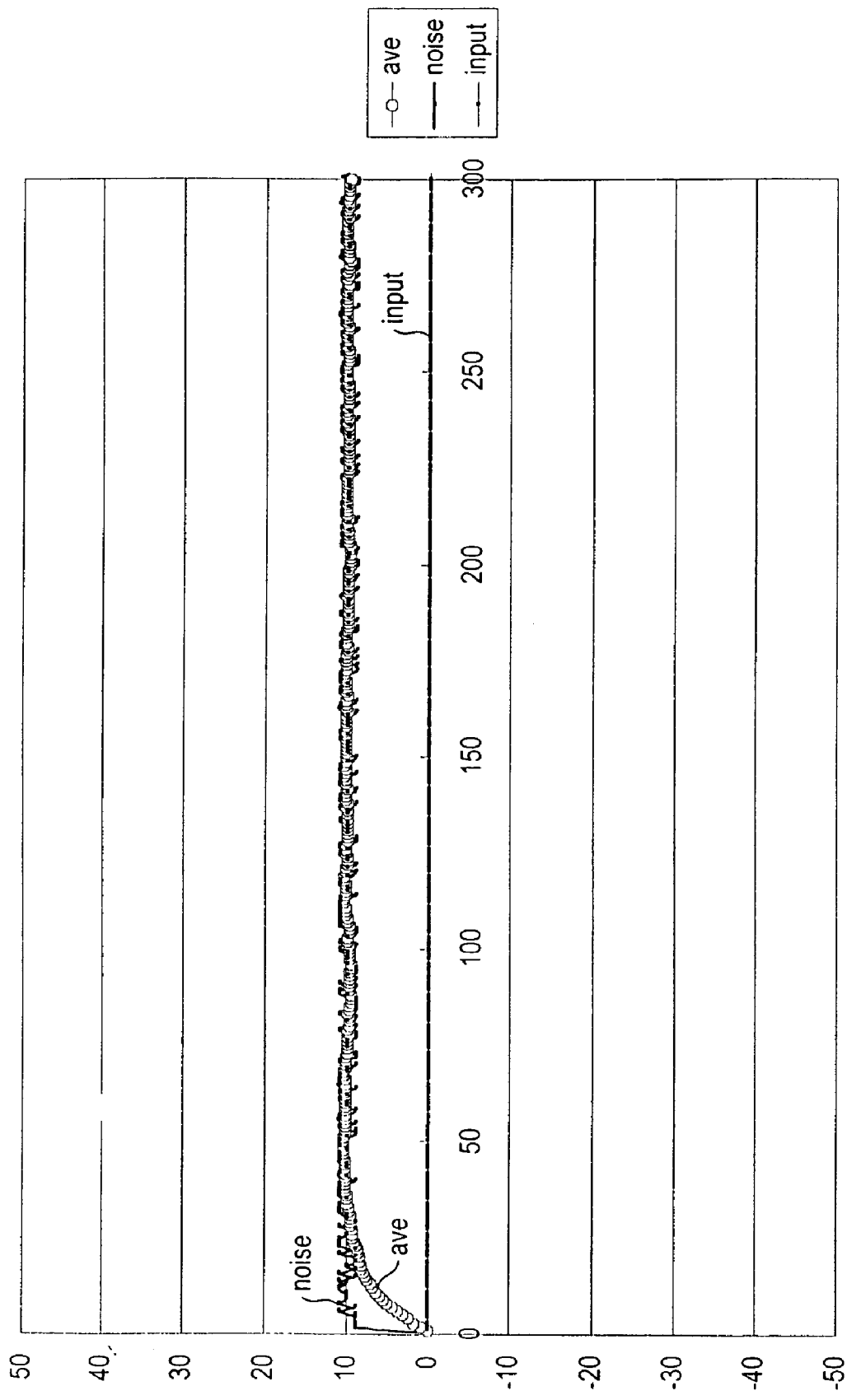
FIG. 15 is a graph showing a simulation result obtained in the fifth embodiment.

FIG. 15 shows a result obtained by simulating changes in noise (noise), input signal (input) without the noise, and value (ave) of the memory 213. FIG. 15 shows the inphase transition in a frame and an example wherein noise data varies within a narrow range (9 to 11 in FIG. 15). In the example, an input signal is 0, i.e., only noise enters a microphone. One cycle of the head switching pulse is 1/150 sec.

The numerical values along the abscissa represent the number of frames while the ordinate represents data values. In this example, K=0.1.

As can be seen from FIG. 15, extraction of noise is started from the beginning. After 40 frames (about 0.26 sec), the value ave of the memory 213 becomes equal to the noise (noise). More specifically, FIG. 15 shows that an accurate noise removal signal can be generated after 40 frames.

Figure 16:
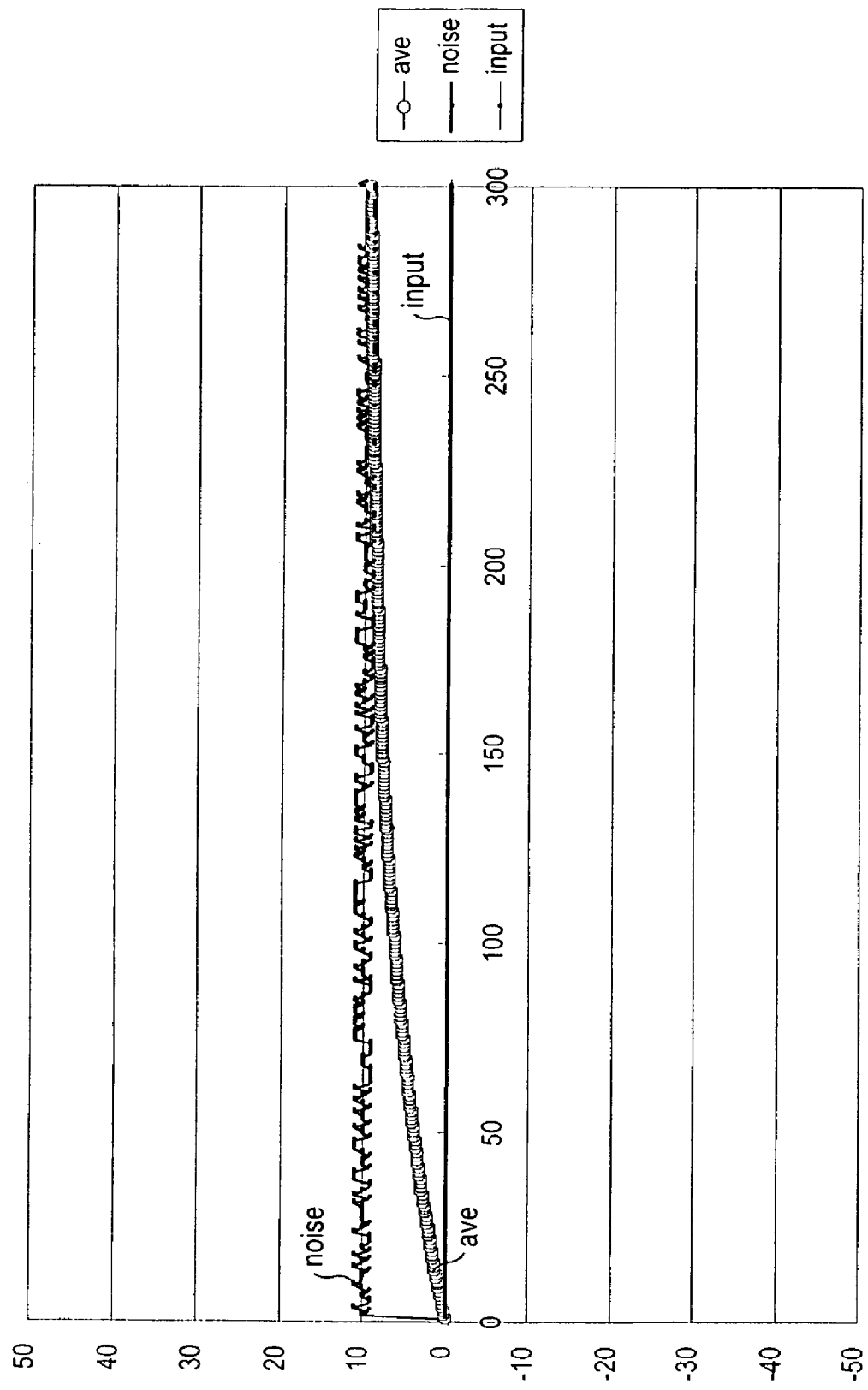
FIG. 16 is a graph showing a simulation result obtained in the fifth embodiment.

FIG. 16 shows an example of a simulation on the same condition as that of FIG. 15 except that K=0.01.

In this example, since the weighting factor K by which the input signal input is to be multiplied is smaller, it takes much time for the signal ave from the memory 213 to approach the noise data noise.

Figure 17:
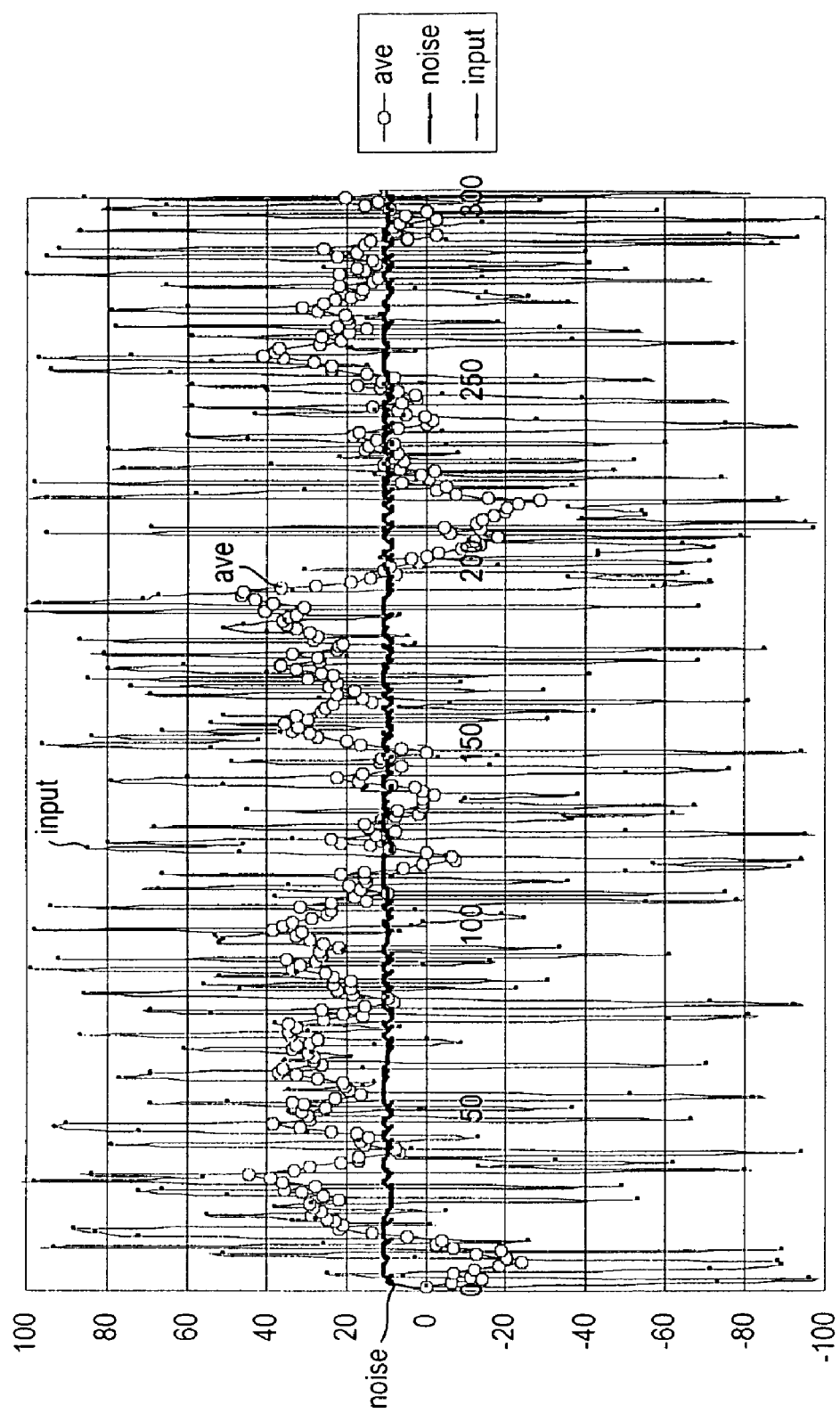
FIG. 17 is a graph showing a simulation result obtained in the fifth embodiment.

The above-mentioned conditions are based on a case wherein the input signal input is 0. In practice, noise containing the input signal is extracted. The input signal is a speech signal which fluctuates between positive and negative. A speech signal can be considered as a random signal. FIG. 17 shows a result of simulating that the input signal is a random signal whose value ranges from −100 to 100. The weighting factor K at this time is 0.1.

As can be seen from FIG. 17, the average ave does not converge under the influence of the input signal input.

Figure 18:
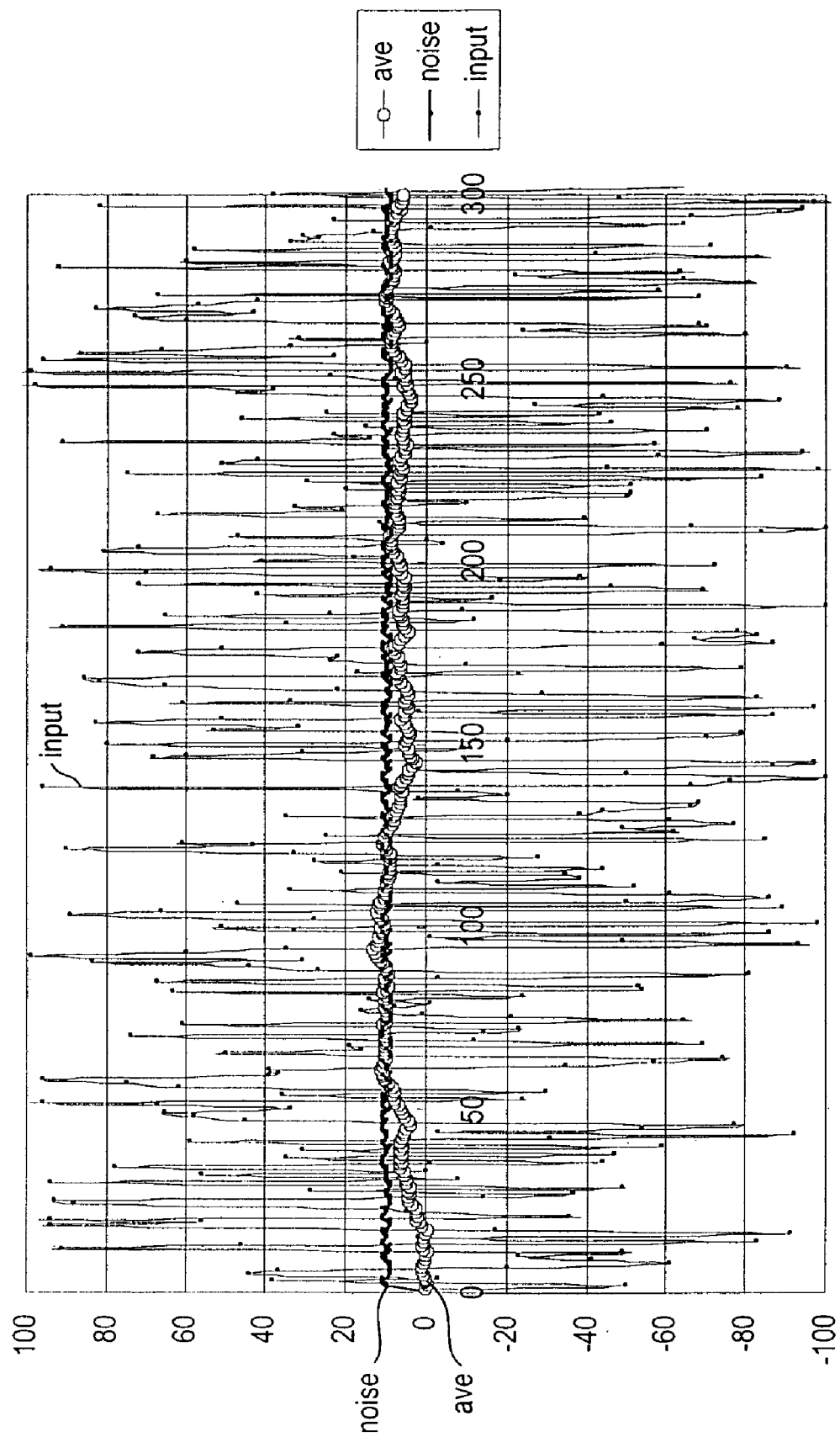
FIG. 18 is a graph showing a simulation result obtained in the fifth embodiment.

FIG. 18 shows a result of simulating in the same manner as in FIG. 17 except that the value of K is 0.01 to cope with this.

As can be seen from FIG. 18, the average ave is less disordered than when K=0.1 but is still unstable.

Figure 19:
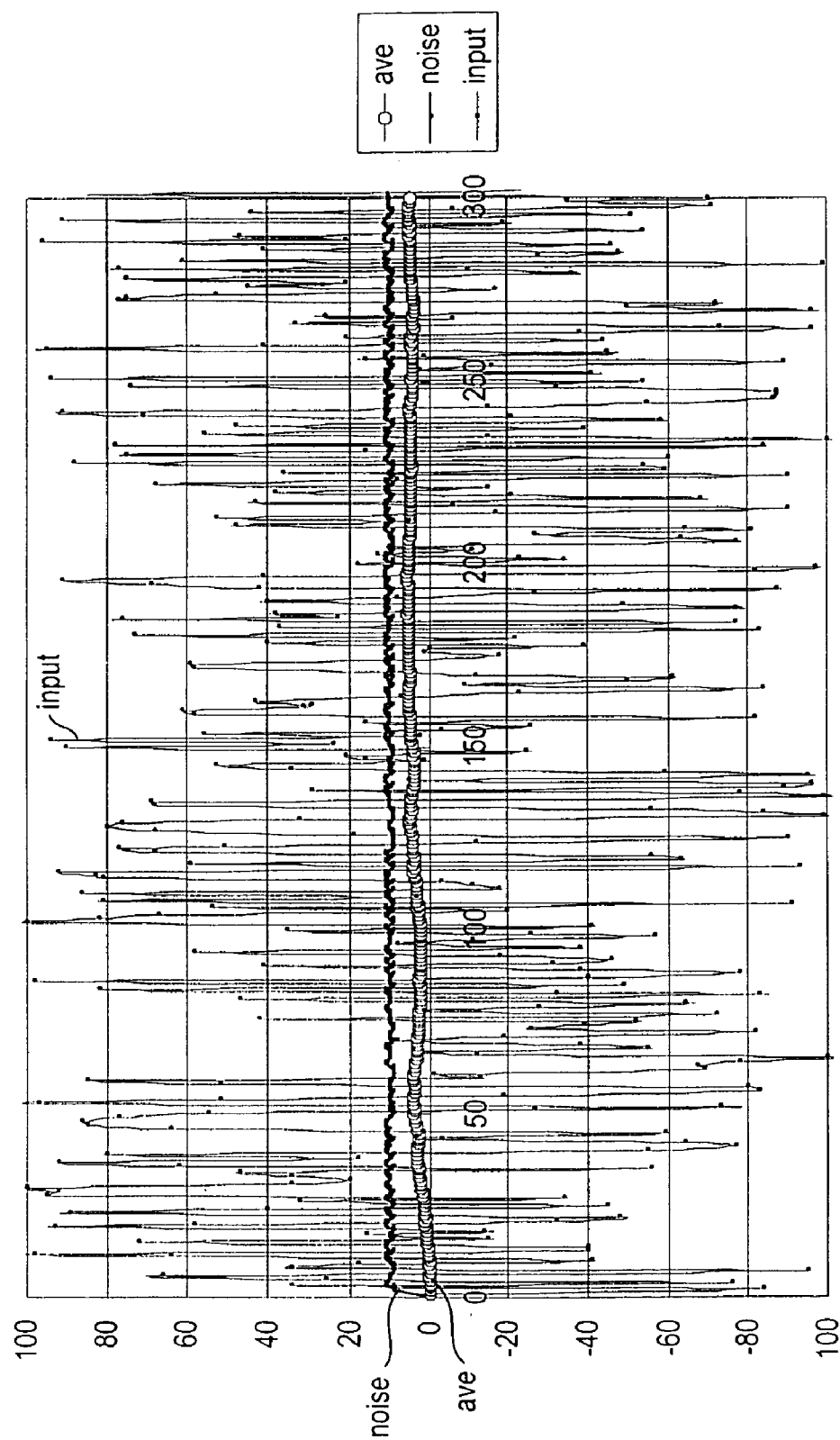
FIG. 19 is a graph showing a simulation result obtained in the fifth embodiment.

FIG. 19 shows an example wherein K is set to have a smaller value of 0.003. As can be seen from FIG. 19, the stability is improved, and the average approaches a value of 10 of the noise data noise. It takes much time to converge. In this example, the time is 300 frames, i.e., (1/150)×300=2 sec. As the waiting time until the apparatus shifts to a good recording state, a shorter time is desirable.

As described above, to shorten the time for a value stored in the memory 213 to converge into noise data, the apparatus needs to be set in a silent state, and the value of K is set to have a relatively large value such as 0.1. If the apparatus is in a non-silent state, the value of K needs to be small. It takes much time for the value stored in the memory 213 to become substantially the same as noise data. Under the circumstances, in the fifth embodiment, the value of K is arranged to dynamically vary.

Since the noise data noise takes a value ranging from 9 to 11, a threshold value for K is set to have a fluctuation range close to but wider than that of the noise data noise.

For example, the threshold value is set to 10±10 (=0, 20), and K is set to 0.1 if the input data input falls within the threshold value range. On the other hand, if the input data falls outside the threshold value range, K is set to have a small value such as 0.001.

Figure 20:
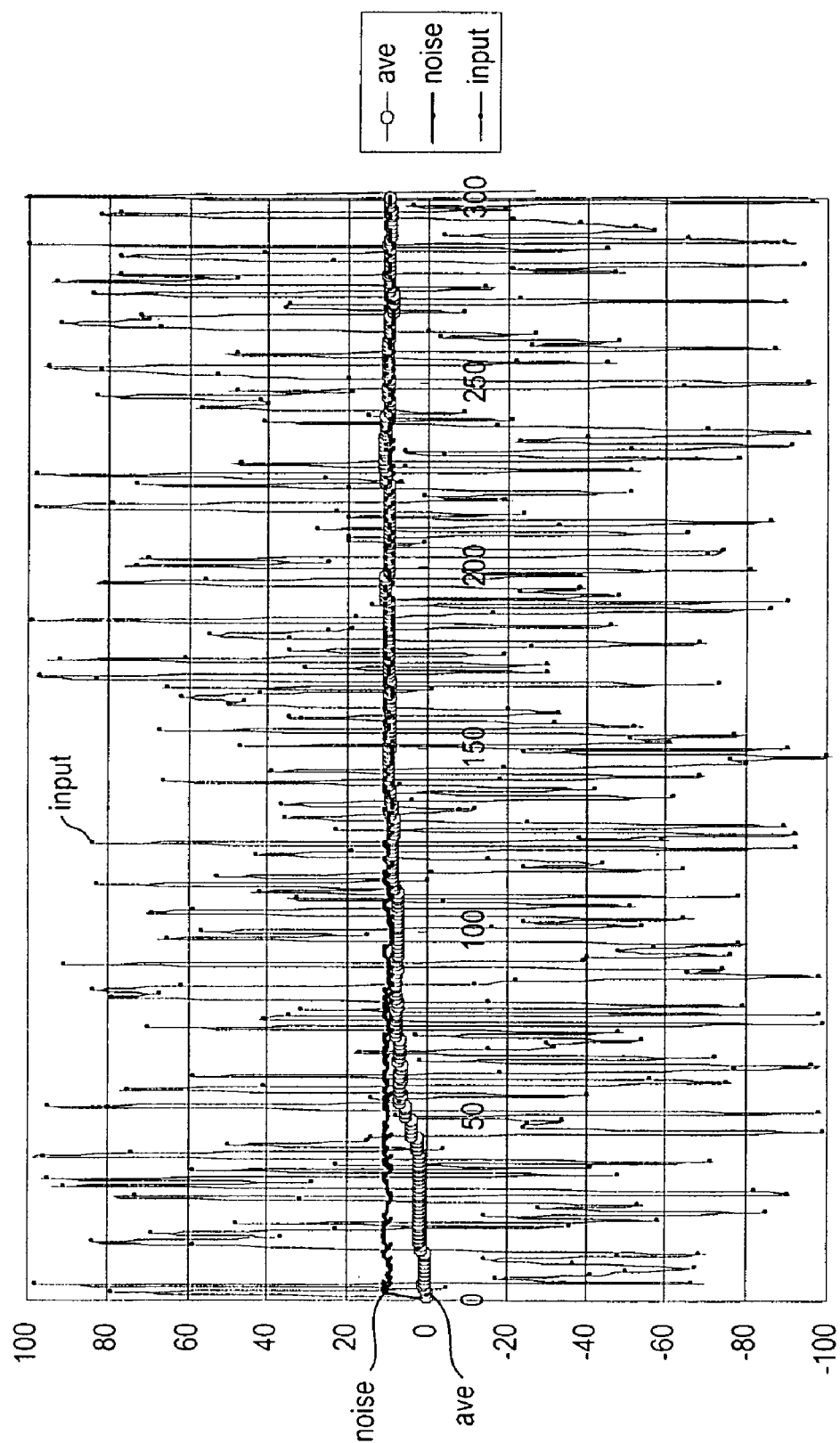
FIG. 20 is a graph showing a simulation result obtained in the fifth embodiment.

FIG. 20 shows a result of simulation under these conditions.

As shown in FIG. 20, the signal ave converges into the noise data noise at an early stage.

Figure 21:
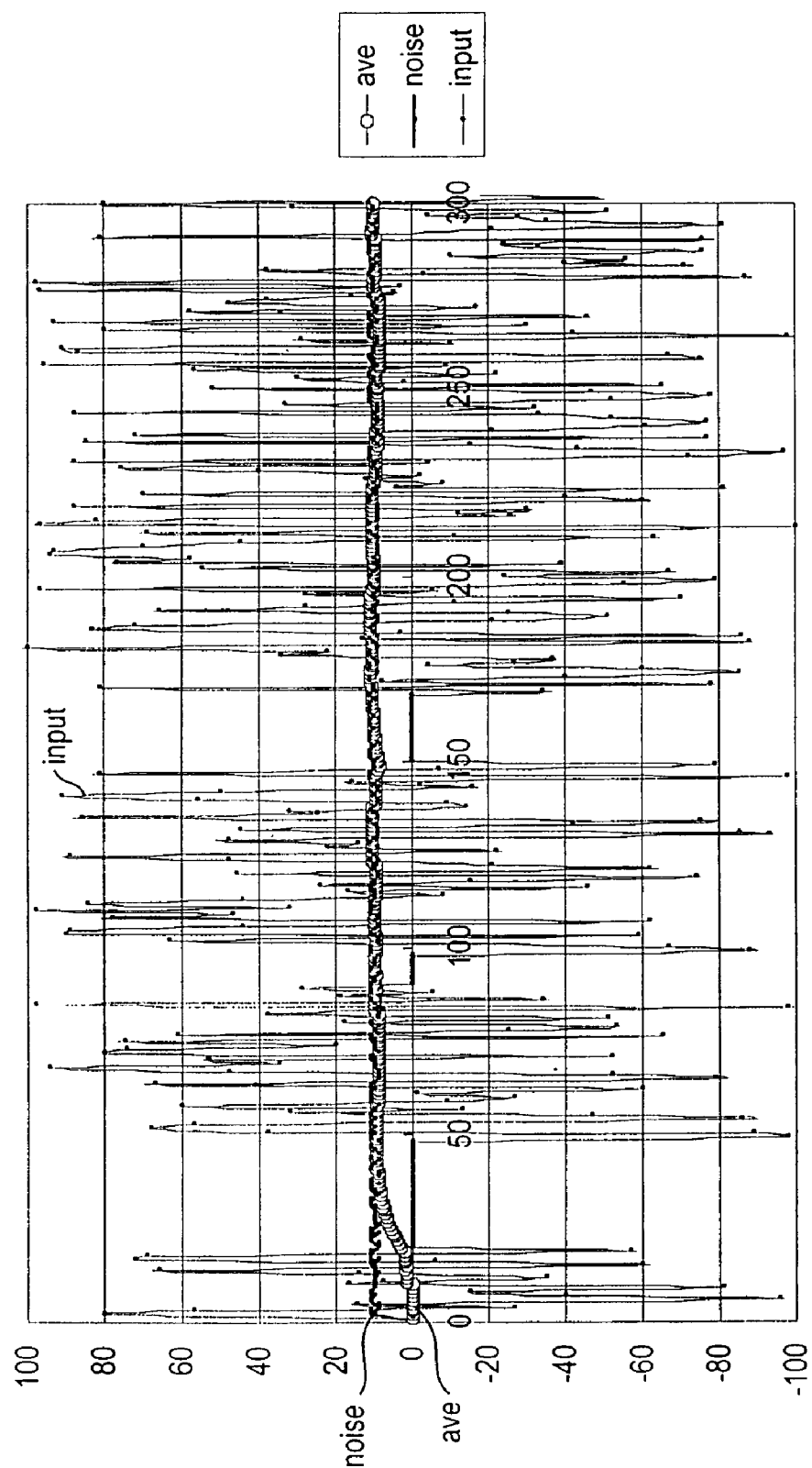
FIG. 21 is a graph showing a simulation result obtained in the fifth embodiment.

In practice, the input data input often includes a silent period, as can easily be understood from normal conversation. FIG. 21 shows the result of a simulation which reflects this situation. During a silent period, the signal ave immediately approaches the noise data noise and becomes stable.

For the above-mentioned reasons, two threshold values which have a range larger by a predetermined value than the fluctuation range of the noise data noise are set in the registers 225 and 226 in the average calculation unit 5a in the fifth embodiment. When the input data input falls within a threshold value range, the weighting factor multiplier 217 multiplies the input data input by the weighting factor K0, and the weighting factor multiplier 219 multiplies the signal ave from the memory 213 by the weighting factor (1−K0). When the input data input falls within the threshold value range, the weighting factor multiplier 217 multiplies the input data input by the weighting factor K1 (K1<<K0), and the weighting factor multiplier 219 multiplies the signal ave from the memory 213 by the weighting factor (1−K1).

Sixth Embodiment

The sixth embodiment will be described below. Note that the device configuration is the same as that of the fifth embodiment.

Figure 14:
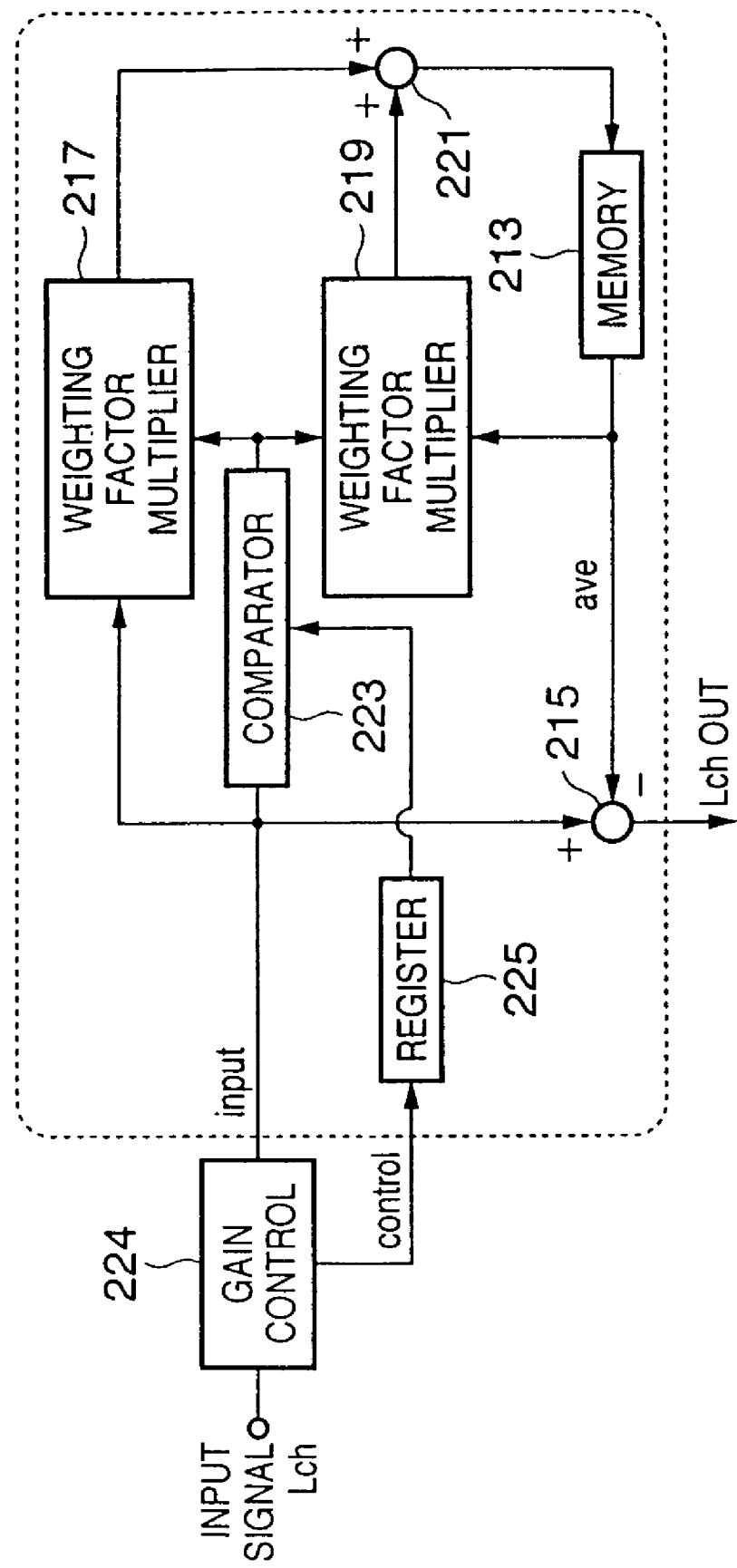
FIG. 14 is a block diagram of a data computing unit according to the sixth embodiment.

The sixth embodiment is characterized in that threshold values for registers 225 and 226 are changed when the gain in gain control is adjusted. For this reason, the circuitry for L channel in a data computing unit 205a according to the sixth embodiment is shown in FIG. 14. Note that this also applies to R channel.

A method of changing the sensitivity of a microphone is known. This embodiment takes a video camera as an example, and thus, its sensitivity can be adjusted by an operation unit (not shown).

The level of noise is changed by an adjustment value of the gain of a gain control 224. For example, if the control gain is 1, the level of noise ranges from 9 to 11. Two threshold values at this time take the values described in the fifth embodiment.

Figure 22:
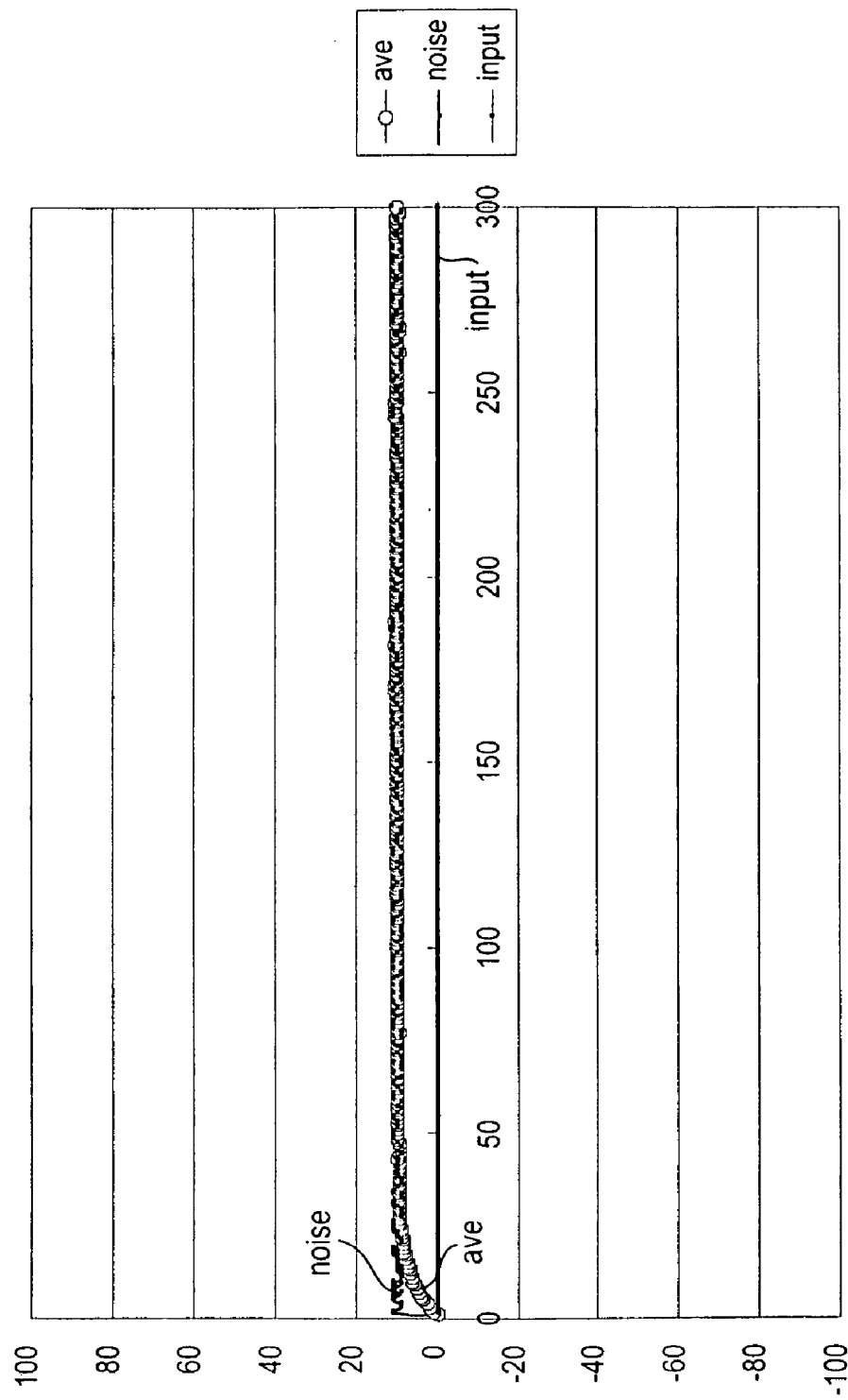
FIG. 22 is a graph showing a simulation result obtained in the sixth embodiment.

More specifically, the threshold values are set to 10±10 (=0, 20), and K is set to 0.1 if an input data input falls within the threshold value range. If the input data falls outside the threshold value range, K is set to 0.001. If the input data input is 0, a simulation result as shown in FIG. 22 is obtained.

Figure 23:
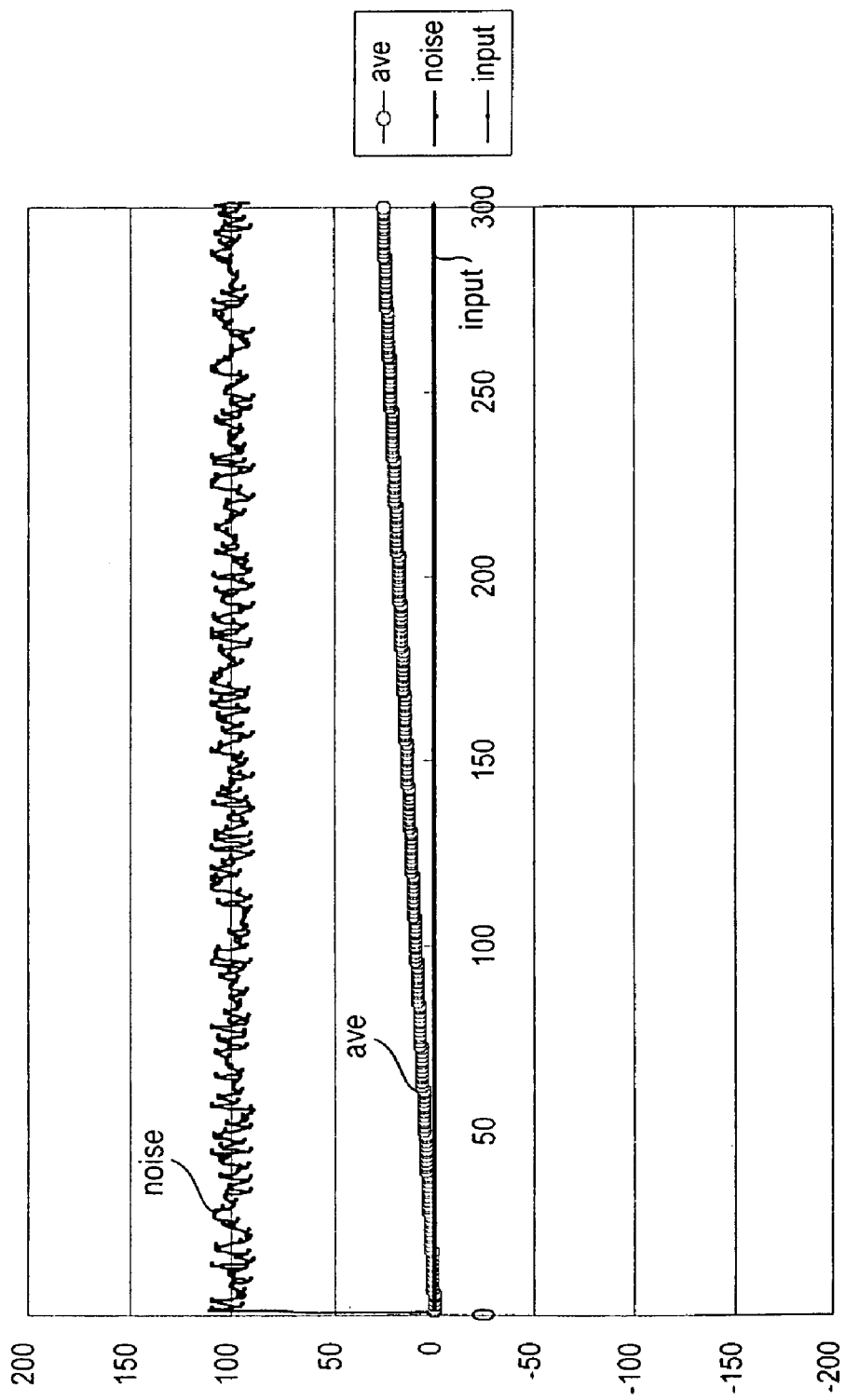
FIG. 23 is a graph showing a simulation result obtained in the sixth embodiment.

If the threshold value remains the same, and the adjustment value for the comparator 224 is set to 10, the noise data noise increases tenfold and comes to range from 90 to 110. FIG. 23 shows a simulation result of this state.

As can be seen from FIG. 23, the level of the noise data noise falls outside the threshold value range at any time point due to adjustment of the gain control 224. Accordingly, convergence of the signal ave into the noise data noise slows down.

Figure 24:
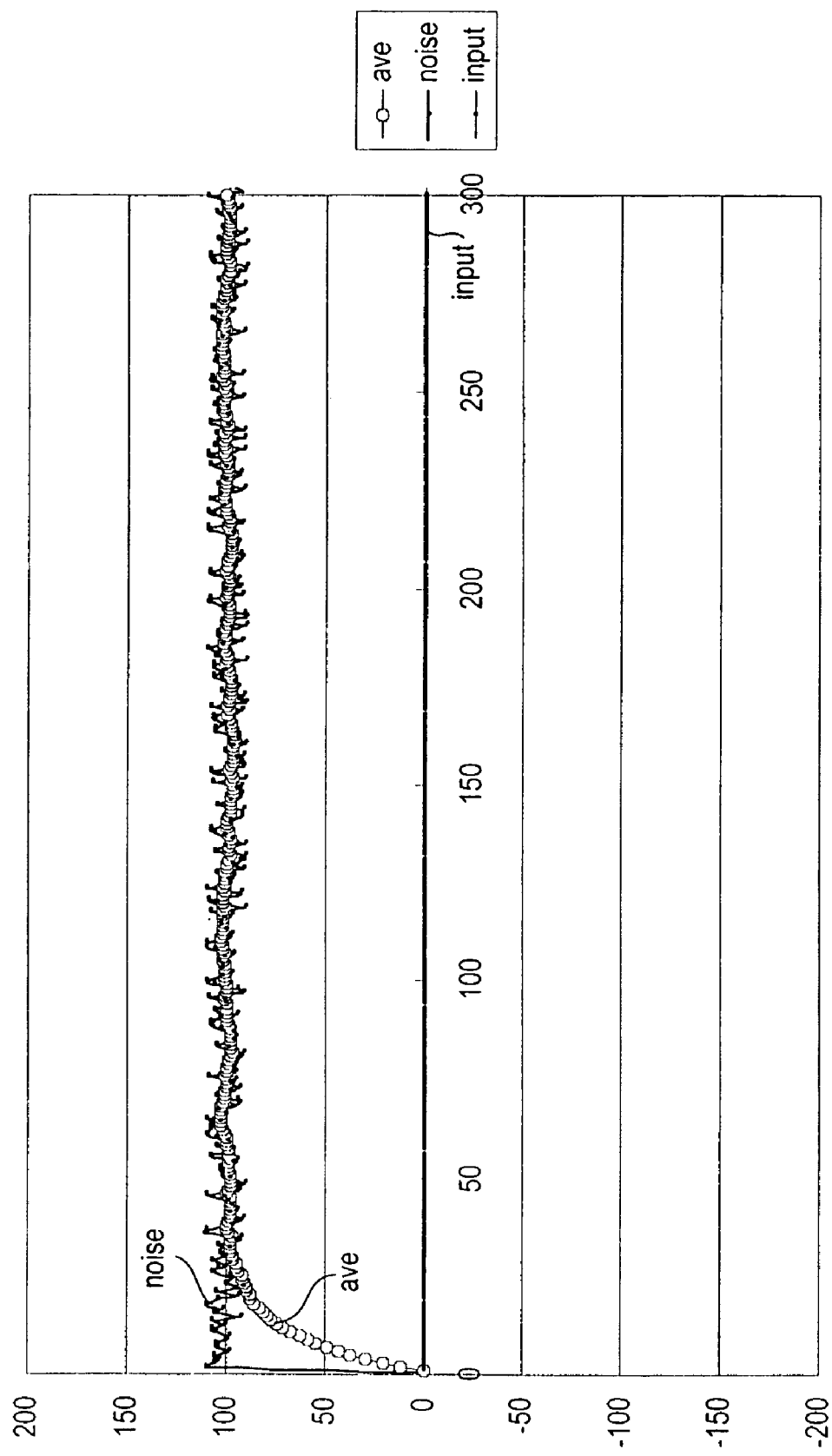
FIG. 24 is a graph showing a simulation result obtained in the sixth embodiment.

Under the circumstances, the sixth embodiment changes the threshold values set in the registers 225 and 226 in accordance with the adjustment result of the gain control 224. More specifically, if the gain control 224 changes the adjustment value from 1 to 10, the threshold values are set to (10±10)× 10=0, 200. FIG. 24 shows a simulation result of this case.

As shown in FIG. 24, it can be understood that the signal ave approaches the noise data noise at the early stage.

The attenuation amount of noise at this time depends on the rotation precision of a rotary drum 2 and the fluctuation range in level of generated noise. Assume that with respect to the maximum frequency of noise components to be reduced, rotation nonuniformity changes the phase of the frequency by, e.g., 5°, and the fluctuation range is 2 dB with respect to the average. FIG. 7 shows the attenuation amount when calculating the difference between two signals having different phases and levels. Considering the above-mentioned conditions, the attenuation amount reaches 15 dB or more from FIG. 7, and a sufficient effect can be obtained.

As described above, according to the fifth and sixth embodiments, even when periodic mechanical noise generated in the apparatus is superposed on an electrical signal obtained through the microphone, speech data which cancels the mechanical noise can be generated. By performing calculations in a process of observing the magnitude of an input signal and changing the weighting factors for the input signal and an average which is already calculated and stored in a memory while comparing with threshold values, noise data of interest can accurately be stored in the memories 213 and 214 at high speed. Data without noise can be obtained from input acoustic data. As for data stored in the memories 213 and 214, data corresponding to the latest periodic mechanical noise generated in the apparatus is stored. Thus, noise can be removed in accordance with a change over time.

This embodiment has exemplified noise generated when a head mounted on a drum which records a magnetic tape comes into contact with or separates from the tape, as noise from a source of mechanical noise. Since there is also electromagnetic noise at the time of rotation of a capstan, the present invention is not limited to this embodiment. In short, every time periodic mechanical noise occurs, the techniques described in the above-mentioned embodiments may be adopted for each noise (the cycles are not always the same).

As described above, according to this embodiment, when noise from a component such as a rotary drum, which performs periodic operation, of a recording/playback apparatus enters a microphone, noise waveforms can be extracted, and the noise can be reduced.

Also, as for noise from a component such as a rotary drum or one which performs periodic operation like rotation of a capstan motor for conveying a tape, noise waveforms can be extracted every independent cycle. There can be provided an apparatus which produces a better noise reduction effect.

Even when noise entering a microphone varies in magnitude and tone quality depending on the device, individual adjustment is unnecessary. In case of a change over time, noise specific to the device can be handled by the same means and same processing.

Unlike the prior art, speech components to be recorded are not removed by filtering, and only unnecessary noise waveforms are removed. Noise reduction without degradation in speech quality can be implemented.

The above embodiments have described that the data computing unit 5a is always in operation. However, the data computing unit 5a may be arranged to update memories 13 and 14 in its initial stage at power-on and may be inhibited from updating after that. It is unthinkable that the power of a video camera is ON for a long time. Even with this arrangement, a change over time can be followed satisfactorily.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application Nos. 2003-397817 filed on Nov. 27, 2003 and No. 2004-265928 filed on Sep. 13, 2004, which are hereby incorporated by reference herein.

What is claimed is:

1. An electronic device comprising:
   an acoustic wave gathering unit which converts an acoustic wave into an electrical signal;
   a first driving unit which operates in cycles;
   a first computing unit which averages in phase pluralities of acoustic data output from said acoustic wave gathering unit over a plurality of cycles of said first driving unit to obtain an average of acoustic data;
   a second driving unit which operates in cycles different from those of said first driving unit;
   a second computing unit which averages in phase pluralities of acoustic data output from said acoustic wave gathering unit over a plurality of cycles of said second driving unit to obtain an average of acoustic data; and
   a synthesizing unit which synthesizes in phase averages of the acoustic data output from said first and second computing units and acoustic data output from said acoustic wave gathering unit,
   wherein said first and second computing units perform an average operation by inputting the acoustic data to be supplied to said synthesizing unit.

2. The device according to claim 1, wherein the averages calculated by said first and second computing units are moving averages.

3. The device according to claim 1, wherein the averages calculated by said first and second computing units are obtained by performing weighted average operation by setting a weighting amount of acoustic data output from said acoustic wave gathering unit to k and setting a weighting amount of an average calculated before the acoustic data to 1-k.

4. The device according to claim 1, wherein, if a level of input acoustic data is not less than a predetermined threshold value, said first and second computing units eliminate the acoustic data from average operation.

* * * * *